United States Patent [19]
Mallard

[11] Patent Number: 4,835,699
[45] Date of Patent: May 30, 1989

[54] AUTOMATED DISTRIBUTED CONTROL SYSTEM FOR A WEAVING MILL

[75] Inventor: Jerry F. Mallard, High Point, N.C.

[73] Assignee: Burlington Industries, Inc., Greensboro, N.C.

[21] Appl. No.: 28,820

[22] Filed: Mar. 23, 1987

[51] Int. Cl.$^4$ .................. G05B 19/40; G06F 15/46
[52] U.S. Cl. .................. 364/470; 364/188; 364/468; 364/900; 340/825.06; 340/825.17; 377/16; 139/62; 139/35
[58] Field of Search .............. 364/470, 200 MS File, 364/900 MS File, 188, 189, 190; 66/75.2, 232; 139/62; 340/825.17; 377/15, 16

[56] References Cited

U.S. PATENT DOCUMENTS

| | | | |
|---|---|---|---|
| 2,326,768 | 8/1943 | Eddy | 377/15 |
| 3,059,238 | 10/1962 | Quinn | 346/34 |
| 3,293,605 | 12/1966 | Moore | 340/150 |
| 3,323,107 | 5/1967 | DuVall | 340/147 |
| 3,414,905 | 12/1968 | O'Brien et al. | 346/33 |
| 3,417,916 | 2/1964 | Broukel et al. | 234/54 |
| 3,491,340 | 1/1970 | Richman et al. | 340/172.5 |
| 3,566,355 | 2/1971 | Smith | 340/147 |
| 3,570,550 | 3/1971 | Budzyma | 139/336 |
| 3,588,832 | 6/1971 | Duncan | 364/900 |
| 3,597,736 | 8/1971 | Best | 340/163 |
| 3,613,743 | 10/1971 | Sakamoto | 139/348 |
| 3,641,326 | 2/1972 | Harte | 235/151.11 |
| 3,851,315 | 11/1974 | Anderson | 364/470 |
| 3,983,370 | 9/1976 | Caspi et al. | 364/470 |
| 4,057,785 | 11/1977 | Furniss et al. | 340/163 |
| 4,090,248 | 6/1978 | Swanson et al. | 364/900 |
| 4,135,181 | 1/1979 | Bogacki et al. | 340/310 A |
| 4,346,446 | 8/1982 | Erbstein et al. | 364/189 |
| 4,356,475 | 10/1982 | Neumann et al. | 340/521 |
| 4,364,002 | 12/1982 | Suzuki et al. | 318/467 |
| 4,382,287 | 5/1983 | Ackman et al. | 364/900 |
| 4,446,458 | 5/1984 | Cook | 340/825.06 |
| 4,536,849 | 8/1985 | Borisch et al. | 364/550 |

FOREIGN PATENT DOCUMENTS

| | | | |
|---|---|---|---|
| 87424 | 2/1979 | Belgium . | |
| 0182382 | 5/1986 | European Pat. Off. | 364/470 |

OTHER PUBLICATIONS

"Computerized Textiles' Second Stage is Here", *Textile World*, pp. 37-40 (Nov. 1985).
"Barco Communication Module", Selzer-Ruti, Inc. (Oct. 1986).
"Sycotex The Data Unit DU4P for Direct Link to an On-Loom Micro Processor", Barco Automation, Belgium, (Jun. 1984).

*Primary Examiner*—Jerry Smith
*Assistant Examiner*—Paul Gordon
*Attorney, Agent, or Firm*—Nixon & Vanderhye

[57] ABSTRACT

An interactive real-time, distributed control system for textile weaving machines including real time, interactive bi-directional communications centrally manages the whole range of activities of a weaving room. Microcontrollers at each weaving machine control most of the routine weaving functions and operations, but communicate in real time with a central computer which provides large-scale data storage and analysis. Easy, consistent automatic machine set-ups result from electronically downloading cloth style and dobby control data from the central computer to the weaving machine microcontrollers. Because communications between the microcontrollers and the central computer as well as much of the analysis performed by the central computer occur interactively on a real time basis, correction and optimization of the weaving process at individual machines is possible, resulting in higher productivity and quality. Less of quality product is produced since weaving machines are stopped automatically when out-of-control conditions occur and/or real time adjustments in independent weaving variables (e.g., filling angle of release) are made.

31 Claims, 20 Drawing Sheets

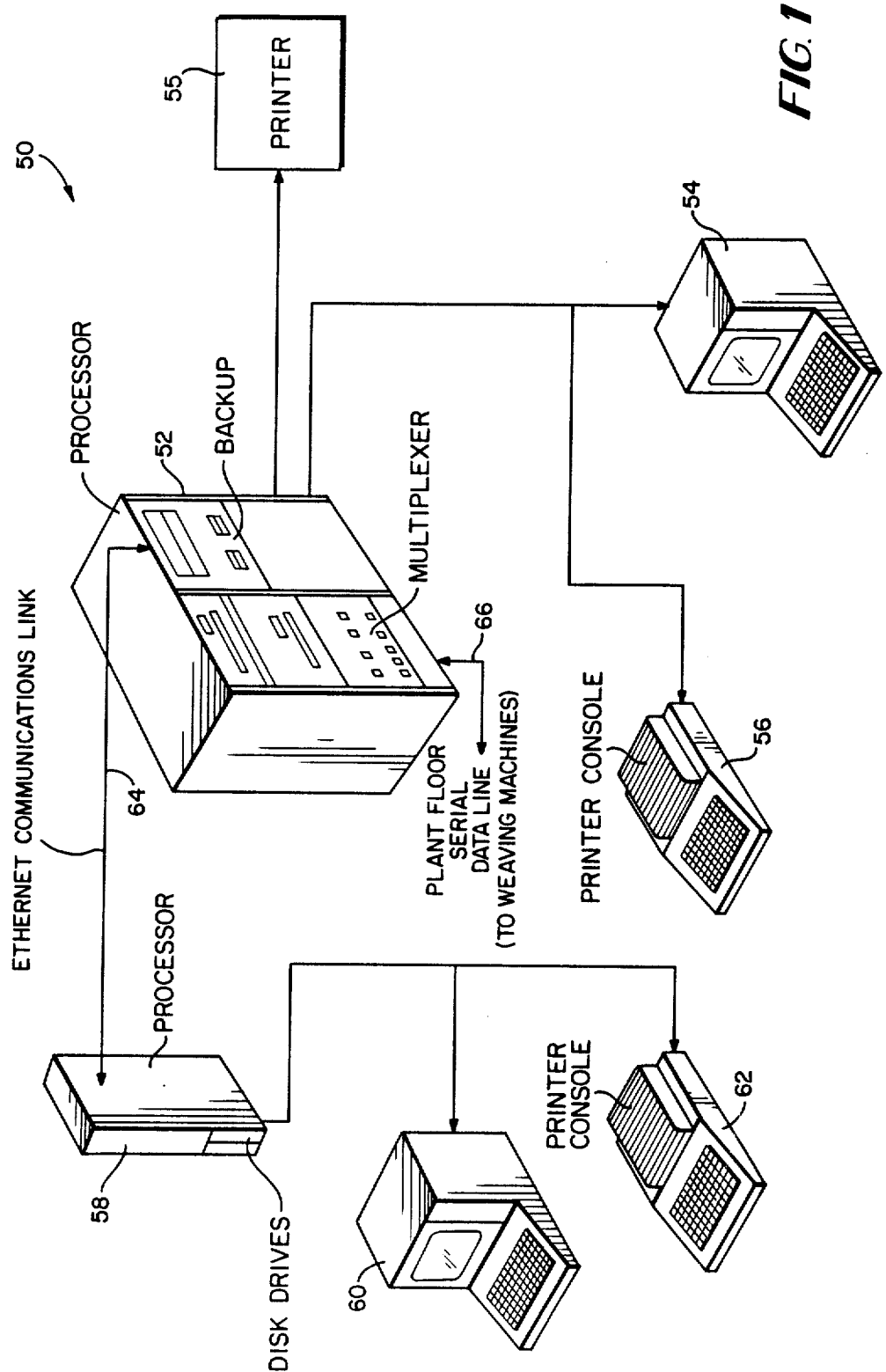

MESSAGES TO HOST-STOP CONTROL

MSG.1

| LOOM NO. | STOP TIME | AUTOMATIC STOP CAUSE CODE |
|---|---|---|

*FIG. 7(A)*

MSG.2

| LOOM NO. | OPERATOR WAIT TIME |
|---|---|

*FIG. 7(B)*

MSG.3

| LOOM NO. | OPERATOR REPAIR TIME | DECLARED CAUSE CODE | RESTART TIME |
|---|---|---|---|

*FIG. 7(C)*

| LOOM NO. | FIXER CALL TIME | OPERATOR REPAIR TIME |
|---|---|---|

*FIG. 7(D)*

MSG.4

| LOOM NO. | FIXER WAIT TIME |
|---|---|

*FIG. 7(E)*

MSG.5

| LOOM NO. | FIXER REPAIR TIME | DECLARED REPAIR CODE | RESTART TIME |
|---|---|---|---|

*FIG. 7(F)*

CENTRAL CONTROLLER LOOM DATABASE

| ID | Field |
|---|---|
| 402 | LOOM NO. |
| 404 | DATE/TIME OF LAST MAJOR PARTS CHANGE |
| 406 | DATE/TIME OF LAST 6000 HR. PREVENTIVE MAINTENANCE |
| 408 | DATE/TIME OF LAST LUBRICATION |
| 410 | DATE/TIME OF MAJOR ADJUSTMENT |
| 412a | STOP NO. 1 |
| 414a | STYLE |
| 416a | OPERATOR |
| 418a | SHIFT |
| 420a | FIXER |
| 422a | AUTOMATIC STOP CODE |
| 424a | DECLARED STOP CAUSE CODE |
| 426a | REPAIR TIME |
| 428a | FIXER ACTION |
| 430a | WARP NUMBER |
| 432a | CUT NUMBER |
| 434a | YARDAGE FROM START OF WARP |
| 436a | FILLING YARN LOT |
| 438a | FILLING PACKAGE ID |
| 412b | STOP NO. 2 |
| ... | ... |
| 438b | FILLING PACKAGE |

CENTRAL CONTROLLER LOOM DATABASE

| | |
|---|---|
| 442 | LOOM BEAM |
| 444 | FILLING PACKAGE I.D. (CURRENT) |
| 446 | FILLING PACKAGE LOT (CURRENT) |
| 448 | CURRENT OPERATOR |
| 450 | CURRENT FIXER |
| 452 | CURRENT SUPERVISOR |
| 454 | CURRENT SHIFT |
| 456 | TIME SINCE STYLE CHANGE |
| 458 | TIME SINCE LAST REPAIR |
| 460 | DECLARED STOP CAUSE OF LAST STOP |
| 462 | CURRENT STYLE |
| 464 | NUMBER OF PICKS PERFORMED SINCE LAST STYLE CHANGE (PICKNUM) |
| 466 | TARGET NUMBER OF PICKS TO BE PERFORMED FOR THIS STYLE (PICKTARG) |
| 470 | CUT MANAGEMENT AT EXACT PICKCOUNT REQD ? |
| 472 | CUT PICK |
| 474 | CUT PICK TARG |

440 brackets rows 442–466
463 brackets rows 470–474

*FIG. 8(B)*

CENTRAL CONTROLLER
FIXER EFFECTIVENESS DATABASE

| | |
|---|---|
| | FIXER I.D. |
| 362 | STOP NO. 1 |
| 364 | TYPE OF STOP |
| 366 | LOOM NO. |
| 368 | STYLE |
| 370 | TIME OF STOP |
| 372 | FIXER WAIT TIME |
| 374 | FIXER REPAIR TIME |
| 376 | REPAIR FIX |
| 378 | PARTS CHANGED |
| 380 | OTHER ACTION REQUIRED |
| 382 | TIME TO NEXT STOP |
| 384 | TIME TO NEXT STOP OF SAME TYPE |

} 360(1)

⋮

| STOP NO. N |
|---|
| ⋮ |
| TIME TO NEXT STOP OF SAME TYPE |

CENTRAL CONTROLLER DATABASE LOOM INSERTION SYSTEM

FIG. 13

| Ref | Field |
|---|---|
| 604a | STYLE |
| 606a | LOOM NO. |
| 608a | MAIN NOZZLE SERIAL NO. |
| 610a | REED TYPE, S/N & AGE |
| 612a | NO. OF WARP ENDS |
| 614a | FILLING TYPE |
| 616a | TARGET AIR PRESSURE ($P_{TARGET}$) |
| 618a | MAX. AIR PRESSURE ($P_{MAX}$) |
| 620a | MIN. AIR PRESSURE ($P_{MIN}$) |
| 622a | STYLE $K$ VALUE |
| 624a | TARGET ARRIVAL TIME ($X_{TARGET}$) |
| 626a | MAX. ARRIVAL TIME ($X_{MAX}$) |
| 628a | MIN. ARRIVAL TIME ($X_{MIN}$) |
| 630a | MAX. ALLOWABLE STANDARD DEVIATION OF $X$ |
| 632a | AVERAGE AIR PRESSURE USED BY HOUR |
| 634a | AVERAGE AIR PRESSURE USED BY DAY |
| 636a | AVERAGE AIR PRESSURE USED BY WEEK |
| 638a | AVERAGE AIR PRESSURE USED BY MONTH |

⎫ 602(A)

⋮

| 604n | STYLE |
| 606n | LOOM NO. |

⋮

| 638n | AVERAGE AIR PRESSURE |

CENTRAL COMPUTER STYLE SETPOINT DATABASE (800)

| | "F"-FUNCTIONS | DOBBY SETTINGS | PERFORMANCE CRITERIA ACCEPTABLE RANGES |
|---|---|---|---|
| 802(1) STYLE 1 | | | |
| 802(2) STYLE 2 | " " | " " | " " |
| 802(3) STYLE 3 | " " | " " | " " |
| 802(4) STYLE 4 | " " | " " | " " |
| 802(5) STYLE 5 | " " | " " | " " |
| ⋮ | ⋮ | ⋮ | ⋮ |
| 802(N) STYLE N | " " | " " | " " |

STYLE CHANGE DATABASE

900(1):
- 902(1) STYLE 1
- 904(1) LOOM NO.
- 906(1) "F" - FUNCTIONS DOWNLOADED TO LOOM
- 908(1) TIME OF LAST STYLE SETPOINT CHANGE THIS LOOM
- 910(1) BY WHEN STYLE SETPOINT CHANGE THIS LOOM
- 912(1) NO. OF STOPS THIS STYLE (PER CMPX)
- 916(1) NO. OF FILLING STOPS THIS STYLE (PER CMPX)
- 918(1) PERSON (CREW) WHO MADE LAST STYLE CHANGE

900(2):
- 902(2) STYLE 2
- ⋮
- 918(2) PERSON (CREW) WHO MADE LAST STYLE CHANGE

900(N):
- 902(N) STYLE N
- ⋮
- 918(N) PERSON (CREW) WHO MADE LAST STYLE CHANGE

AUTOMATED DISTRIBUTED CONTROL SYSTEM FOR A WEAVING MILL

FIELD OF THE INVENTION

This invention relates to textile weaving machines such as looms, and more particularly, to a computer-controlled automatic distributed control system which controls weaving machines. Still more particularly, the present invention relates to an automatic electronic industrial control system for controlling weaving machines (looms) wherein digital control signals are communicated bi-directionally from a main processor to local processors at each of plural weaving machines and from the weaving machine local processors to the main processor to achieve interactive real-time control and monitoring.

BACKGROUND AND SUMMARY OF THE INVENTION

The most significant development in the weaving industry in recent years has been the on-board microprocessor control system. In recent years, microprocessors have been installed on-board individual weaving machines (e.g., "looms") to control the operation of the weaving machines. These on-board microprocessors are typically connected to a central minicomputer which monitors status data produced by the on-board microprocessors indicating, for example, machine stops, stop causes, speed efficiency and production rates.

Most such systems in the past have used unidirectional communications links between the weaving machine on-board microprocessor controllers and the loom monitoring system—that is, status data is communicated from the loom to the host processor, but control data is typically not communicated in the reverse direction back to the loom. In a few cases, off/on control of weaving machine signalling lights and the stop function has been achieved.

The deficiencies of these systems include: (1) the inability to control the set points of the independent, programmable variables of the weaving process except manually at each loom; (2) the inability to make style changes on single and multiple weaving machines digitally without sending a person to each machine, (3) the inability to optimize individual machines in a real-time manner, (4) the inability to analyze machine performance statistically in a real-time manner and to automatically adjust or stop the weaving machine, and (5) the inability to automatically signal auxiliary equipment or people (e.g., when a cloth roll needs to be doffed, when a filling package or warp needs to be delivered, or when a human technician needs to service the reed).

The concept of providing "bi-directional" data communications between a central processor controlling a weaving plant and mini-computers controlling individual weaving machines is known. See, for example, "Computerized Textiles' Second Stage Is Here", *Textile World*, pages 37–40 (November 1985). That article suggests bi-directional systems which control air-jet weaving machines, and describes three "levels" of bi-directional communication.

The first level involves signals, indicators and stopping of the weaving machine in order to improve productivity and quality (e.g., signalling a problem machine for too many stops, stopping a loom for doffing or for quality reasons, or flashing a lamp to tell the weaver to make corrections concerning the nature of warp stop).

The second level of bi-directional communications suggested by the *Textile World* article permits down loading of different settings required to operate a machine in a certain style, and requires a compatible interface (microprocessor) on board each weaving machine. This second level could, for example, set up an air-jet weaving machine to produce a certain style by instructing the machine on parameters for filling insertion, warp tension, stop positions, and the like.

The third level of bi-directional communications permits interactive control of individual weaving machines to, for example, determine if there are differences in settings of different machines, adjust the settings of a poorly performing machine, and report such interventional control in a log file.

While these three levels of bi-directional control have previously been suggested, the state-of-the-art loom monitoring and control systems available prior to the development of the present invention were not nearly so versatile. For example, in the Barco Automation System (manufactured by Barco Electric N.V. of Holland), a separate data collection and control "box" (designated DU4P) was required at each loom. This "box" had the following functions: (1) read a 12-bit status code generated by the loom to determine when a stop or start occurred, the cause of the start or stop, and the picks produced; (2) close a relay to turn on an indicator light or open a relay to turn a light off; (3) give an operator a message on a limited textural display; and (4) receive limited code inputs from the operator about stop causes or quality problems. This Barco system was incapable of influencing loom controls—all control by the loom monitoring system being through relays housed in a separate enclosure.

The following prior-issued U.S. patents are generally relevant in disclosing "bi-directional" monitoring/control systems utilized for purposes other than textile applications:

| U.S. Pat. No. | Inventor | Issue Date |
|---|---|---|
| 4,090,248 | Swanson et al | May 16, 1978 |
| 4,135,181 | Bogacki et al | Jan. 16, 1979 |
| 4,446,458 | Cook | May 1, 1984 |

Below is a non-exhaustive list of references disclosing electronic control systems for looms and weaving machines:

| U.S. Pat. No. | Inventor | Issue Date |
|---|---|---|
| 4,364,002 | Suzuki et al | Dec. 14, 1982 |
| 3,570,550 | Budzyma | Mar. 16, 1971 |
| 3,613,743 | Sakamoto | Oct. 19, 1971 |
| 3,597,736 | Best | Aug. 3, 1971 |
| 3,414,905 | O'Brien et al | Dec. 3, 1968 |
| 874,724 | Belgium | Jul. 2, 1979 |

The references listed below are generally relevant in disclosing various data monitoring systems:

| U.S. Pat. No. | Inventor | Issue Date |
|---|---|---|
| 3,417,916 | Broukel et al | Sep. 8, 1964 |
| 4,536,849 | Borish et al | Aug. 20, 1985 |
| 4,382,287 | Ackman et al | May 3, 1983 |
| 4,356,475 | Neumann et al | Oct. 26, 1982 |

-continued

| U.S. Pat. No. | Inventor | Issue Date |
| --- | --- | --- |
| 4,057,785 | Furniss et al | Nov. 8, 1977 |
| 3,641,326 | Harte | Feb. 8, 1972 |
| 3,566,355 | Smith | Feb. 23, 1971 |
| 3,491,340 | Richman et al | Jan. 20, 1970 |
| 3,323,107 | DuVall | May 30, 1967 |
| 3,293,605 | Moore | Dec. 20, 1966 |
| 3,059,238 | Quinn | Oct. 16, 1962 |

While some efforts in the past apparently may have succeeded in producing automated loom control systems which include limited bi-directional communication of status and command signals between on-board loom microprocessors and a central computer, there is room for much additional improvement.

It would be highly advantageous to provide a real-time, distributed control system for weaving machines that is bi-directional and includes various advantageous features which improve overall system performance and product quality.

For example, it would be desirable to automatically and consistently achieve desired machine set-up, reduce machine down-time, reduce labor costs, produce higher productivity and quality of product, improve trouble shooting capability, and the like—all through automatic, reliable control processes.

On a somewhat more detailed level, it would be highly desirable to maintain various different "set-up" files or set points for different independent weaving variables like cloth style, and automatically execute style changes from such maintained set-up files. Statistical evaluation of monitored variables which results in the generation of out-of-control warning messages and/or interactive generation of corrective changes automatically would also be highly desirable. Automatic stopping of weaving machines as a function of monitored general processing conditions would improve product quality, as would automatic collection of data indicative of product quality inputted by roving inspectors via keyboards of individual weaving machines (or by automatically gathering data relating to product quality from each weaving machine). Automatic generation of suitable command messages to humans or other automated systems for service of individual weaving machines, and "smart" software algorithms for automatically generating new style set-ups would reduce weaving machine down-time and labor costs.

The present invention provides an interactive real-time, distributed control system for weaving machine control that is bi-directional and centrally manages the whole range of activities of a weaving room. Some of the advantages of the system of the present invention include:

Easy, consistent automatic machine set-ups;

Elimination of excessive machine down-time due to a person having to key in machine set-up data manually;

Reduction of labor related to weaving due to set-up changes;

Higher productivity and quality produced from optimized weaving processes;

Improvements related to trouble shooting and other diagnostic capabilities on a real-time basis through an interactive distributed control network; and Less off quality since weaving machines are stopped automatically when out-of-control conditions occur and/or when significant deleterious statistical trends are detected (in previous designs, weaving machines would run out-of-control until a person detected the out-of-control operation and manually shut down the faulty machine).

In accordance with one aspect of the present invention, there is no need for a separate control box at each loom for data collection, since the invention allows data collection through an on-loom microprocessor which communicates bi-directionally with a central computer (the central computer having the capacity to efficiently store and analyze data collected from many looms). By eliminating separate data collection boxes at each loom, the costs of a separate enclosure, key pad, monitoring post and brackets, and the like, are eliminated; operator efficiency is increased (since operators do not have to use two different key pads and displays); the discrete control devices needed to control lights and machine stops are eliminated; wiring expenses are reduced (since there are not as many connections); and the entire data collection process is speeded up (thereby permitting rapid, real-time, interactive control of individual looms).

The present invention is also capable of real-time optimization of loom operating functions (e.g., the loom's programmable F functions—independent weaving variables) under software control. For example, loom filling arrival time is a function of main air nozzle pressure and pick release timing degrees. The present invention may increase or decrease main air nozzle pressure over a limited range in an amount which is related to the weaving style (i.e., to a targeted value) to control filling arrival time. If arrival time is still incorrect, then pick release timing degrees may be changed as needed to optimize the arrival time within a limited range.

The present invention also provides capability for changing machine set-up parameters, electrically and automatically, at a style change. In the present invention, the system host computer maintains current loom set-up data (e.g., F functions) by style and also contains (in a real-time register) the number of picks each loom must perform until the next style change. When a style change is requested, the new loom control information is automatically communicated to the loom on-board microprocessor and the changes are made automatically and electrically. This feature permits optimum set-up for a loom and style combination through the use of statistical techniques and a data base which maintains independent style set-ups by loom number. Set-ups can be made accurately and quickly at desired times. This feature is a great advantage over past situations, where a person had to go to each loom and key in all of these style change variables manually, often causing looms to remain idle for several hours awaiting service.

The present invention also performs statistical evaluation of monitored quality and performance variables to determine whether specific looms are out-of-control. If a loom is found to be out-of-control, diagnostic and corrective steps are automatically performed to improve control through control variable adjustment and optimization and/or exception messages are generated to alert personnel that manual trouble shooting is necessary. Such statistical evaluation and control occurs on a real-time basis, thus allowing higher efficiencies to be achieved. In addition, automatic collection of real-time direct and indirect labor data from each loom is gathered, thereby eliminating the need for frequency checks and time studies. Additionally, this data can be fed electronically into a labor data base for other uses (e.g., budget and labor standard determinations).

The gathering of real-time data from each loom also permits the interface of real-time data from the weaving process with automatic loom servicing equipment without the need for human intervention. For example, the central computer may determine whenever any filling package is empty (since all package transfers are detected)—and automatically arrange for a new filling package to be delivered to the loom.

The present invention also enhances control of dobby patterns. The central computer may automatically, electrically down load new dobby control data to individual looms as part of style set-up file transfer.

Looms may be stopped based on several conditions, including all or certain types of out-of-control conditions (e.g., when automatically gathered quality data from a loom indicates the quality of product being produced is inferior to that specified by quality data input by an operator); roll completion (i.e., a predetermined number of picks) insufficient supplied air pressure, the need for a style change, incorrect environmental conditions, and/or based on data already available on the loom beam being fed to the loom.

In accordance with another feature of the present invention, cut length (i.e., the number of picks on a cut or piece) may be controlled precisely. For example, when a customer requires exact cut lengths, the loom can be stopped automatically for a cut doff at the exact desired number of picks by transmitting a control communication message from the host computer to the particular loom. As another example, if precise cut lengths are not required, the centralized host computer can optimize the cut lengths based on the length of the loom beam supplied from slashing.

In accordance with another feature of the present invention, the host computer may predict the quality of the cloth being produced by a specific loom based on a variety of different variables, including quality of warp being used, the number and type of stops and "flags" (indications of loom operating conditions manually inputted by operators), how the particular filling lot is performing, quality data being inputted at each loom by human operators, and the like, and print a quality report for examination by the customer or by quality control personnel. Quality predictions can be statistically based and performed on a real time interactive basis.

In accordance with yet another feature of the present invention, data is gathered in real time describing the performance of each loom in operation (e.g., out-of-control performance and product quality). Real-time evaluation of this collected data may be used to predict when a specific loom needs service or a major overhaul, or when operators or other persons involved in operating and maintaining looms need retraining. Such information gathered in real time can also be used to provide incentives to such personnel based on product quality and/or loom performance. In addition, this collected data can be used to produce various useful listings (e.g., labor costs, material costs and system performance).

BRIEF DESCRIPTION OF THE DRAWINGS

These and other features and advantages of the present invention will be better and more completely understood by studying the following detailed description of the presently preferred embodiments together with the appended drawings of which:

FIG. 1 is a schematic block diagram of an overall distributed automatic weaving control system of the present invention;

FIGS. 7(A)-7(E) are exemplary formats of messages transmitted from a local loom microcontroller to the central computer shown in FIGS. 2(A) and 2(B) under control of the exemplary program steps shown in FIGS. 5(A) and 5(B);

FIGS. 8A-8B together are a schematic diagram of a loom data base stored and maintained for each loom by the central controller of the preferred embodiment;

FIG. 10 is a schematic diagram of an exemplary fixer effectiveness data base stored and maintained for each fixer by the central controller of the preferred embodiment;

FIG. 13 is a schematic diagram of an exemplary loom insertion data base maintained in the central controller of the preferred embodiment;

FIG. 16 is a schematic diagram of an exemplary style set point data base maintained by the preferred embodiment central computer; and FIG. 17 is a schematic diagram of an exemplary style change data base maintained by the preferred embodiment central computer.

DETAILED DESCRIPTION OF PRESENTLY PREFERRED EXEMPLARY EMBODIMENTS

Figure 2A:
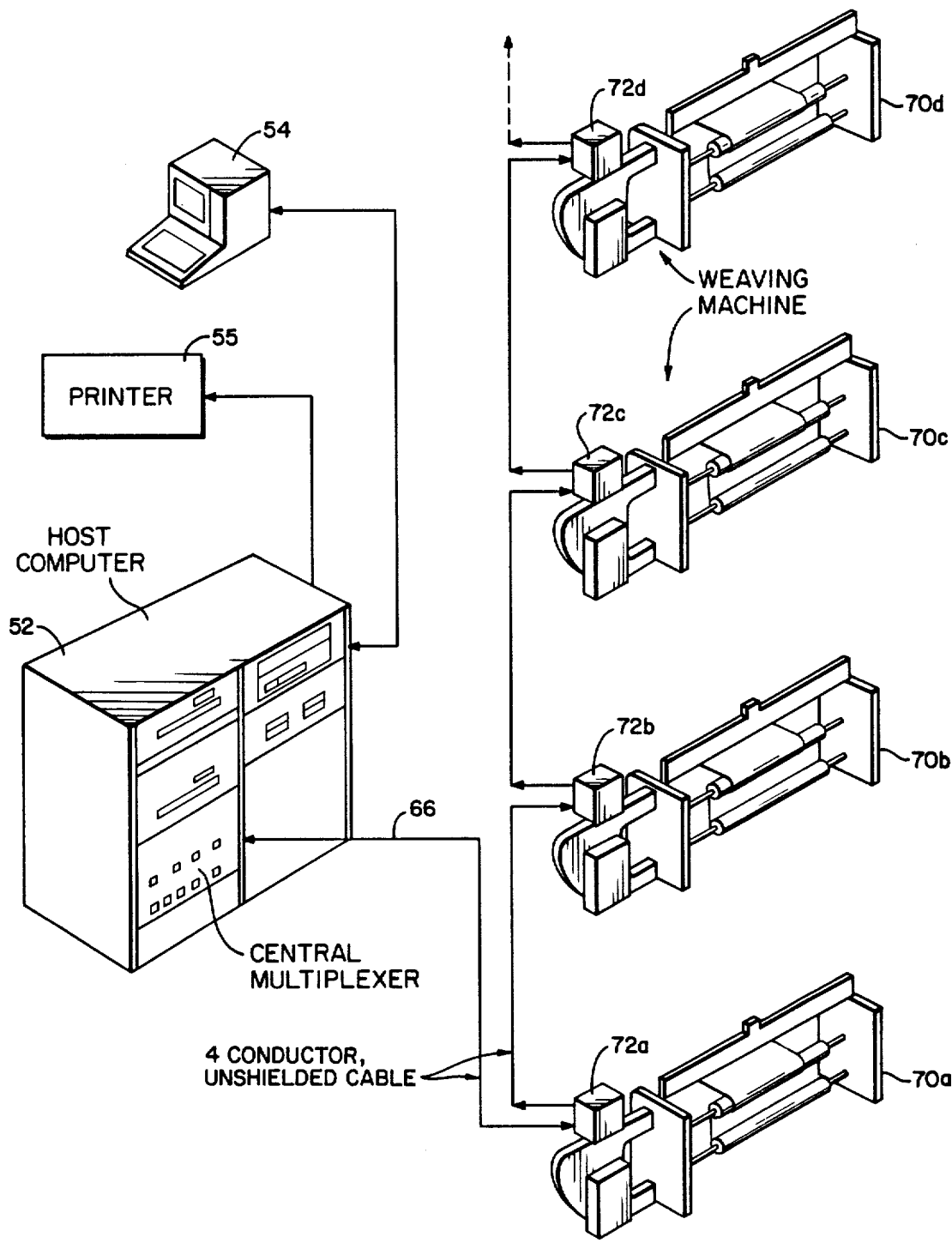
FIGS. 2(A) and 2(B) are schematic and schematic block diagrams, respectively, of individual weaving machines, the centralized computer, and the connections therebetween of the system shown in FIG. 1.

FIG. 1 is a general block diagram of the present preferred exemplary embodiment of a weaving control system 50 of the present invention. System 50 includes a central computer/multiplexer 52 (hereafter referred to as "central computer"), an operator console 54, a printer 55, a printer console 56, and a plurality of weaving machines ("looms"—not shown in FIG. 1). Central computer 52 may be connected to an additional computer 58 (e.g., a large main frame which provides data processing for the entire plant at which system 50 is installed) having its own operator console 60 and printer console 62—this interconnection preferably being made via a high speed communication link 64 (e.g., an ethernet).

In the preferred embodiment, central computer 52 is a Barco Sycotex Loom Monitoring System, which includes a PDP 11/44 computer manufactured by Digital Equipment Corporation of Maynard, Mass. to communicate through one of sixteen multiplexers to microprocessors local to each of a plurality of looms via a serial data line communications network 66. Communications network 66 is configured in the so-called "multi-drop" fashion—meaning that instead of one continuous serial loop being used to communicate with all of the looms, plural smaller "loop" are used in order to increase system reliability and reduce communications time. In the preferred embodiment there can be up to sixteen multi-drop loops of 64 weaving machines per loop included in communications network 66.

A microcontroller local to each weaving machine operates as a node on the loop of communications network 66 to which it is connected. The central computer uses its integral multiplexer to communicate with any desired node. In the preferred embodiment, communication network 66 is a serial, token-passing network with central computer 52 operating as the "master" station and each remote node operating as a "slave." Communication directly between nodes via communications network 66 is also possible.

Figure 2B:
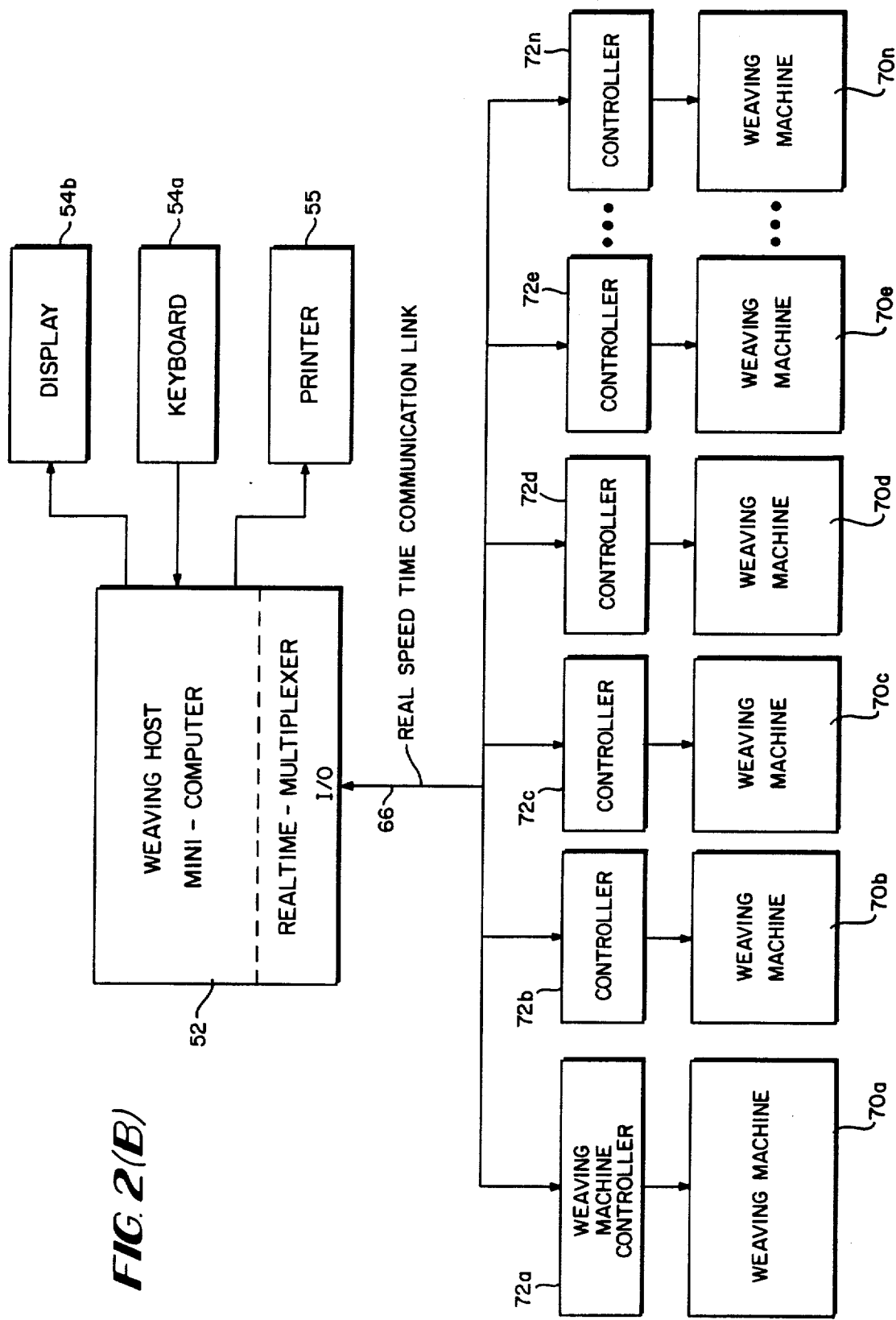

Referring now more particularly to FIGS. 2(A) and 2(B), system 50 includes a plurality of weaving machines (looms) 70a-70n (system 50 can support many hundreds of such looms in the preferred embodiment). Looms 70 in the preferred embodiment are each Model L5001M weaving machines manufactured by Ruti of Switzerland. As those skilled in the art well know, these state-of-the-art weaving machine including on-board microprocessor control and air injection.

Each weaving machine 70 in the preferred embodiment includes a local on-board microcontroller 72 which controls the operation of the machine, communicates signals to central computer 52, and receives signals from the central computer (this signal communication being effected via communications network 66). Hence, each loom 70 operates essentially independently of every other loom, and yet can be directly controlled by central computer 52 in the preferred embodiment.

Figure 3:
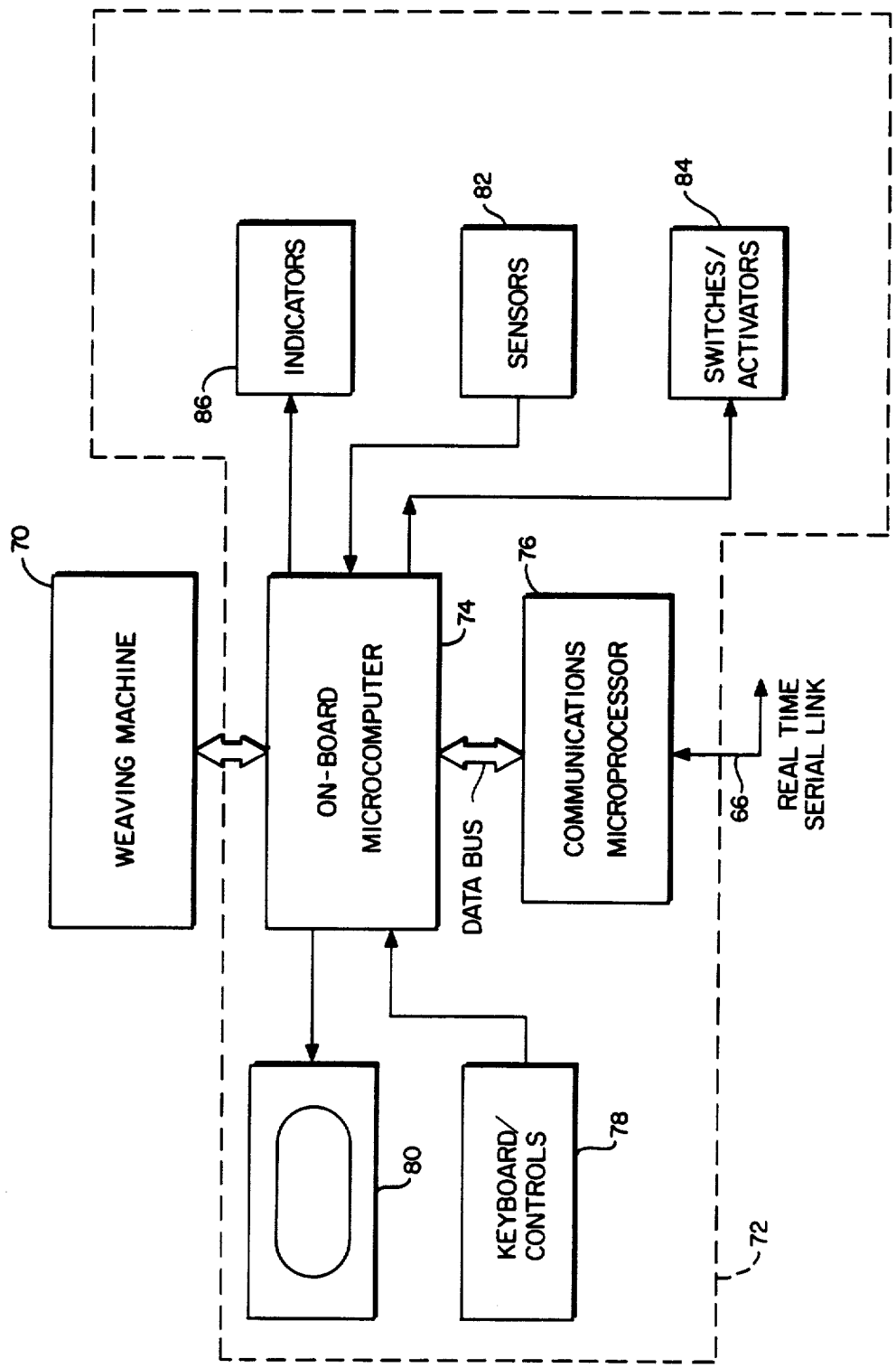
FIG. 3 is a schematic block diagram of an exemplary on-board weaving machine microcontroller shown in FIGS. 2(A) and 2(B)

FIG. 3 is a schematic block diagram of an exemplary weaving machine microcontroller 72. In the preferred embodiment, local microcontroller 72 includes an on-board microcomputer 74, a communications microprocessor 76, a keyboard 78, a display 80, a sensor array 82, a switch/actuator array 84, and an indicator array 86. On-board microcomputer 74 controls practically all aspects of the operation of weaving machine 70 and also monitors various parameters associated with that operation. Microcomputer 74 is capable of sensing, via sensors 82, various different parameters relating to the operation of weaving machine 70 (e.g., air pressure, need for doffing, filling arrival time in degrees, occurrence of a pick, and a variety of other parameters). Microcomputer 74 is capable of controlling several different electronically-actuated portions of weaving machine 70 via switch/actuator array 84 (e.g., the microcomputer can brake the loom, and actuate air valves, scissors motors, the jog clutch, etc.).

Microcomputer 74 displays status information via a CRT display 80 and/or various other visual and audible indicators 86. Microcomputer 74 receives commands inputted via keyboard/controls 78, and also receives commands transmitted by central computer 52 via communications network 66 (and communications microprocessor 76).

Figure 4:
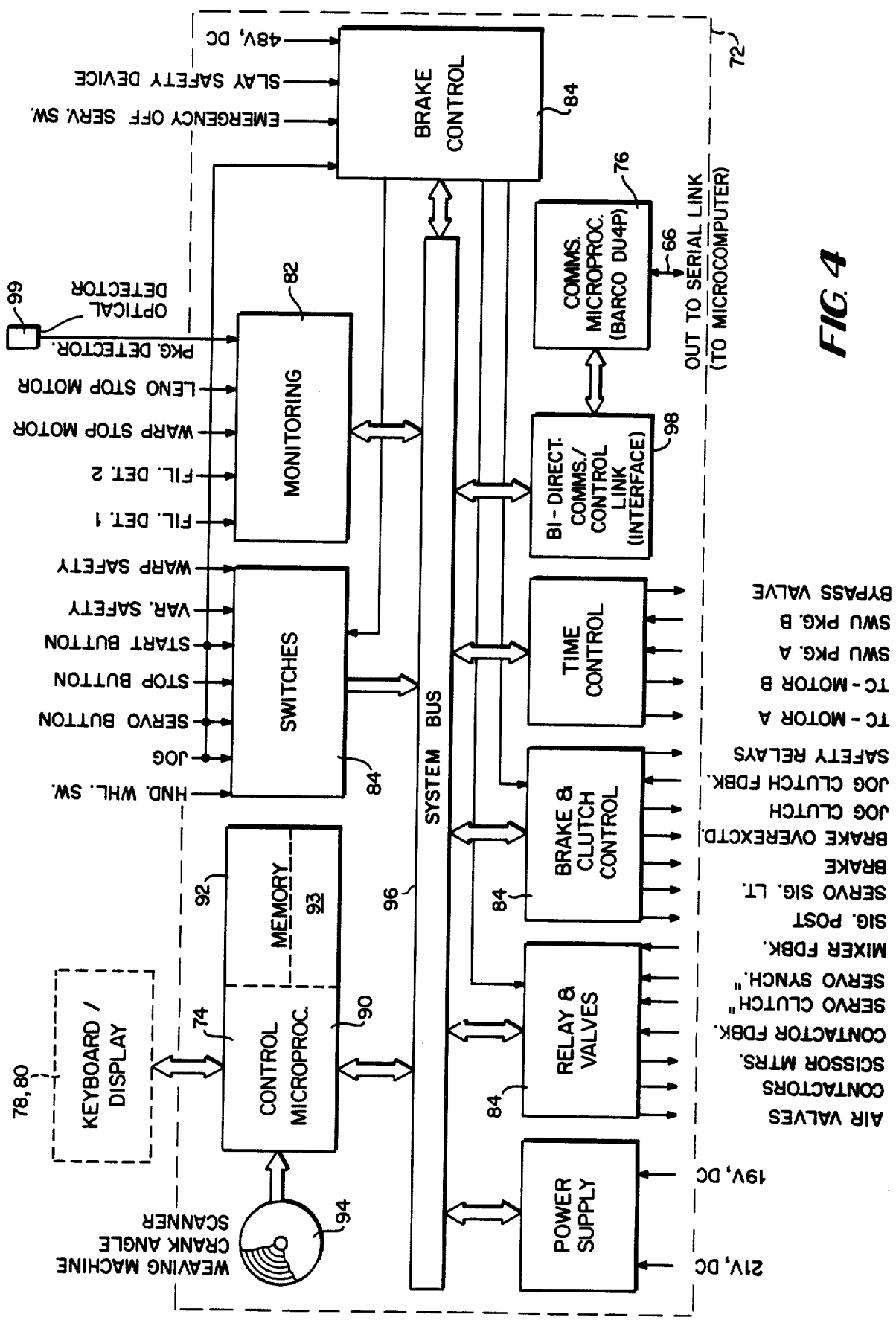
FIG. 4 is a detailed schematic block diagram of the on-board microcomputer of the microcontroller shown in FIG. 3.

Although the structures of on-board microcomputer 74 and communications microprocessor 76 are conventional (these devices being available from Ruti and Barco, respectively), FIG. 4 (a more detailed schematic block diagram of exemplary loom microcontroller 72) is included herein for the sake of clarity and completeness.

The heart of microcontroller 72 is microcomputer 74, which in the preferred embodiment includes ZILOG Z-80 microprocessor 90 and associated random access memory 92. Microprocessor 90 is a conventional single-chip microprocessor which includes registers, an arithmetic logic unit, a real-time clock, an input/output controller, etc. Microprocessor 90 performs control steps specified by computer programs stored in a non-volatile section 93 of random access memory 92 (which in the preferred embodiment is a conventional EPROM read only memory). Memory 92 also provides storage (in a read/write section of the memory) for variables, constants and other values needed by microprocessor 90 for keeping track of the operation of loom 70, performing calculations, etc. as will be explained shortly in greater detail. Microprocessor 74 communicates directly with keyboard/display 78, 80 in the preferred embodiment to permit a person (e.g., a weaver or operator, or a repair technician) to control the operation of loom 70 while he or she is in the vicinity of the loom (i.e., on the production floor).

Microprocessor 90 is connected to a crank angle scanner 94 which monitors the angular position of the rotating loom shaft. Microprocessor 90 is also connected to the conventional shared bi-directional data bus 96 which conveys the outputs of sensor array 82 to the microprocessor and also conveys control signals produced by the microprocessor to switches/actuators 84. In addition, data bus 86 communicates signals from communications microprocessor 76 to control microprocessor 90 and from the control microprocessor to the communications microprocessor.

A parallel, 16-bit communication path between the control microprocessor 90 and communications microprocessor 76 is preferred, although other standard configurations for bus 96 are also possible.

In the preferred embodiment, communications microprocessor 76 includes a modified DU4P communications printed circuit board manufactured by BarcoElectronics N.V. of Kortrijk, Holland. The modified DU4P is connected to a spare "slot" in a connector associated with data bus 96, and is connected to an interface printed circuit board 98 designed as a joint effort by Ruti and Barco and designated number 393644. Interface 98 provides 16-bit communications between communications microprocessor 76 and control microprocessor 90 using a 16-bit protocol developed jointly by the assignee of the subject application, Ruti and Barco. This protocol is described in a publication by Barco Automation entitled "Sycotex The Data Unit DU4P For Direct Link to An On-Loom Micro Processor", which became available to the public around or after June 12, 1984 (this Barco Automation publication is hereby incorporated herein by reference)—and see also the appendix hereto entitled "Bi-directional Communication Using A 16-Bit Parallel Output" (also incorporated by reference herein). Additional information concerning interface 98 and communications microprocessor 76 may be found in various other publicly-available publications of Barco Electronics.

In the preferred embodiment of system 50, signal communications can be initiated either by loom controller 72 or by central computer 52. To send status or other information to central computer 52, control microprocessor 90 communicates digital signals ("messages") which are to be transmitted to interface 98 with a command to transmit the information. Such signals are formatted by control microprocessor 90 to conform with the standard 16-bit protocol set forth in the Barco Automation publication described above before being communicated to interface 98 via data bus 96. Interface 98 communicates data signals produced by control microprocessor 90 to communications microprocessor 76 for transmission to central computer 52 via communications network 66. Central computer 52 includes conventional facilities for receiving data transmitted over network 66 and storing such data in its own internal member for analysis or other action in accordance with the computer program(s) executed by the central computer.

Similarly, central computer 52 may, under software control, transmit commands to a particular loom controller 72 via network 66. Typically, each data message transmitted onto network 66 by central computer 52 includes a so-called "header" field (sometimes called an "address") which designates (by loom number or other convenient identification) the intended recipient of the message. In the preferred embodiment the content of this header field specifies a "physical address" of the loom on communications network 66. Communications microprocessor 76 of each of on-board loom microcontrollers 72 is preprogrammed to recognize a unique identification code (e.g., loom address) corresponding to the loom 70 it controls. Control computer 52 stores data which enables it to translate between physical address and an arbitrary "loom number" designation for each loom 70 as necessary.

When communications microprocessor 76 receives a message having "header" information corresponding to its own identification "address", the communications microprocessor controls interface 98 to communicate the received message to control microprocessor 90. Control microprocessor 90 performs necessary actions in response to the received message (e.g., stop the loom, light an indicator, increase insertion air pressure, etc.).

The process of communicating information between central computer 52 and any desired weaving machine controller 72 is extremely rapid (e.g., on the order of 1 second or less), making possible interactive real-time monitoring and control of individual looms 70 by central computer 52. Thus, the control operations performed by system 50 are distributed between operations performed by central computer 52 and operations performed by loom controllers 72. Most of the routine functions of looms 70 are controlled by associated local loom microcontrollers 72, while supervisory functions and collection of status data is performed centrally by central computer 52. This "distributed processing" architecture facilitates high efficiency of the weaving process, allows hundreds of looms 70 to operate simultaneously and essentially independently, and yet permits important supervisory and analysis functions to be efficiently performed centrally.

Central computer 52 and loom microcontrollers 72, as mentioned previously, each operate under control of computer programs. For example, central computer 52 executes certain applications programs written by Barco Electric in FORTRAN 77 that operate as tasks under the DEC RMX-11M+ operating system. In the preferred embodiment, essential computer peripherals (e.g., display station 54, printer 55, disk drives, etc.) are all standard, conventional peripherals designed to be compatible with the DEC PDP 11/44 computer. Barco Electric designs and manufactures the multiplexer circuits used to establish data communications between central computer 52 and the Barco DU4P communications microprocessor 76 of each loom microcontroller 72 via communications network 66.

System 50 as has been described might be used only to establish a "passive" level of bi-directional control between central computer 52 and loom microcontrollers 72. That is, loom microcontrollers 72 might pass only status information (e.g., out-of-control condition warning messages) to central computer 52 and the central computer might pass only "passive" control signals back to the loom microcontrollers (e.g., for activation of visual indicators such as the cloth roll lamp and excess stop lamp, and for basic control functions such as stopping the loom). However, in the preferred embodiment of the present invention, control programs executed by both central computer 52 and loom microcontroller 72 together determine when exceptions exist in loom operations and control and provide diagnostic and predictive capability in the solving of real-time problems through "interactive" bi-directional communications between the computer and the loom microcontrollers. This sophisticated level of control has not heretofore been available in a weaving control system, and provides a number of important advantages, including the following:

Ease and consistency of automatic machine set-ups;

Elimination of machine down time due to a "fixer" (i.e., a loom repair technician) having to key in machine set-up data manually or due to delays in looms acquiring style changes being attended to by fixers;

Reduction of fixer labor related to weaving because of set-up changes;

Higher productivity and quality resulting from optimization of the weaving process;

Process improvements related to trouble shooting capabilities on a real-time, interactive basis through the distributed control network; and Less "off quality" since looms can be stopped instantly and automatically when out-of-control.

In the preferred embodiment of the present invention, loom microcontrollers 72 continuously monitor and collect data relating to the operation of their associated loom 70. Loom microcontrollers 72 periodically transmit the data they have gathered to central computer 52 for storage and analysis. Central computer 52 analyzes much of this collected data in real time, and, in response thereto, transmits signals to loom microcontrollers 72 which correct out-of-control conditions or cause the loom microcontrollers to perform other control functions (e.g., stop the loom, light indicator lamps, make adjustments to automatically correct out-of-control conditions, etc.).

Because of the sophistication and comprehensive nature of the data collection process performed by loom microcontrollers 72 (for example, the loom microcontrollers collect not only data relating to loom operations, but also data relating to the efficiency and effectiveness of humans attending the looms), the present invention is capable of providing a wide range of performance and diagnostic analyses which were not possible or practical in the past. Moreover, the sophistication of the interactive supervisory control functions performed by central computer 52 allows optimization of the weaving process at each individual loom, thus vastly improving product quality and process efficiency.

For example, central computer 52 in the preferred embodiment maintains "set-up files" (i.e., lists of set point parameters) for different independent weaving variables by cloth style, and executes style changes on selected looms by simply down loading the contents of the set-up files to the loom microcontroller 72 at times specified by a production schedule. Central computer 52 also statistically evaluates weaving dependent and independent variables and takes control action when these variables fall outside of acceptable ranges (i.e., are "out-of-control"). These "out-of-control" ranges are variable, and the control actions which are taken in response to out-of-control conditions are also variable dependent upon process capability and customer specifications. Such responsive control actions include notifying humans of the out-of-control situation (e.g., via textual messages displayed on a CRT) and/or actually directing the loom microcontroller 72 associated with the out-of-control loom 70 to change the set point of an independent weaving variable on an interactive, real-time basis.

Central computer 52 in the preferred embodiment can also stop selected looms if processing conditions (e.g., room humidity and temperature) or critical operating conditions (e.g., water pressure on water-jet looms or air pressure on air-jet looms) fall outside of acceptable ranges. Central computer 52 maintains close surveillance of quality data continuously being collected by loom microcontrollers 72 and transmitted to the central controller via communications network 66. Additional quality data can be input by roving human inspectors through keyboards provided at each loom 70.

When central computer 52 determines on a statistical basis that a particular loom is "out-of-control" such that the quality of the cloth being woven is inferior and/or determines that a significant deleterious statistical trend is present which will soon cause the quality of the woven cloth to be inferior, the central computer stops the loom immediately, alerts human attendants that the loom needs attention and/or service, and then monitors the progress and performance of the human attendants on a real-time interactive basis. Central computer 52 may also originate messages for manual or automated filling package or warp delivery, cloth roll doffing, fixer technician service, machine stops, and the like. Messages are delivered via displays capable of being understood by humans (e.g., CRTs and/or printers), or if the message can be responded to by automated systems (e.g., automated filling package systems), via electronic communication links to those automated systems.

And the functions of central computer 52 in the preferred embodiment are by no means limited to routine control functions which could be performed (perhaps less efficiently) by trained human operators. Central computer 52 can execute sophisticated "knowledge-based" software (which is based on the reasoning and logic of expert weavers) to use the massive amounts of data collected by loom microcontrollers 72 to actually develop new and improved cloth styles. The distributed interactive control capabilities provided by system 50 can then be used to create the new product on one or more looms.

Some exemplary interactive control, monitoring and analysis functions performed by the presently preferred exemplary embodiment of system 50 of the present invention will now be described in connection with flow charts of exemplary control program steps performed by loom microcontrollers 72 and/or central computer 52, schematic diagrams of formats of messages communicated between the loom microcontrollers and the central computer, and schematic diagrams of data bases maintained by the loom microcontrollers and/or the central computer.

INTERACTIVE STOP CONTROL

In the preferred embodiment of system 50, each loom microcontroller 72 continuously checks for a need to stop its associated loom 70 (e.g., if a person has manually depressed the loom stop button, a hand switch has been closed, or a pick has arrived late). When the loom microcontroller 72 detects such a stop, the microcontroller stops its associated loom 70, activates a lamp or other indicator which indicates why the loom has been stopped, and sends a message over communications network 66 informing the central computer 52 that the loom has been stopped (along with the time it was stopped and the reason it was stopped). Loom microcontroller 72 records time beginning with the loom was stopped.

Central computer 52 requests a human operator (weaver) to attend to the stopped loom. When the operator arrives at the loom, he or she depresses an operator key at the loom keyboard which informs associated loom microcontroller 72 that the operator has arrived and has begun to repair the loom. Loom microcontroller 72 then communicates the duration of the wait for an operator to central computer 52 so that the performance and efficiency of the floor work force can be evaluated.

If the operator is able to fix the problem which caused the stoppage, the operator restarts the loom and inputs a declared stop cause code into the loom keyboard. Loom microcontroller 72 communicates the restart time, the declared stop cause code and the length of time it took the operator to repair the loom to central computer 52 for storage and analysis. Loom microcontroller 72 also extinguishes the loom repair indicator at this time. If desired, loom microcontroller 72 may automatically stop loom 70 a predetermined number of picks after restart if the operator fails to input the declared stop cause code.

If the operator is unable to repair the loom, he or she enters a fixer call code into the loom keyboard. Loom microcontroller 72 transmits the fixer call code to central computer 52, and begins to time how long it takes for a fixer (technician) to arrive. Central computer 52 informs a fixer that the loom needs attention (e.g., by automatically sending the fixer a message via a display station and/or issuing additional visual indications).

The fixer enters a fixer arrrival code into the loom keyboard when he or she arrives at the loom, causing loom controller 72 to cease timing fixer wait time and to begin timing fixer repair time (the loom microcontroller may communicate the fixer wait time to central computer 52 at this point). When the fixer completes the repair, he or she enters a repair code indicating corrective action taken (e.g., a part change, an adjustment, or the like) via the loop keyboard. Loom microcontroller 72 communicates the entered repair code to central computer 52 along with fixer repair time and restart time.

Thus, central computer 52 receives a great deal of information about each loom stop, including loom number, the time the stop occurred, an automatic diagnostic code for the stop (e.g., hard stop, warp stop, filling stop, etc.) in a first message; operator wait time in a second message; operator repair time, operator declared stop cause code, and restart time or alternatively, fixer called time if a fixer is called (in a third message); fixer wait time (in a fourth message); and fixer repair timer, fixer declared repair code (i.e., parts changes, adjustments required or other action) and restart time (in a fifth message). Central computer 52 updates an internal data base it maintains on the stopped loom in real time as it receives the messages transmitted to it by the loom microcontroller 72.

During this procedure, if the fixer or operator fails to enter the required codes, loom microcontroller 72 can power off some or all of the loom components after a predetermined period of time has passed or a predetermined number of picks have occurred, and request the operator or fixer to enter the required code through the local loom display terminal.

Figure 5A:
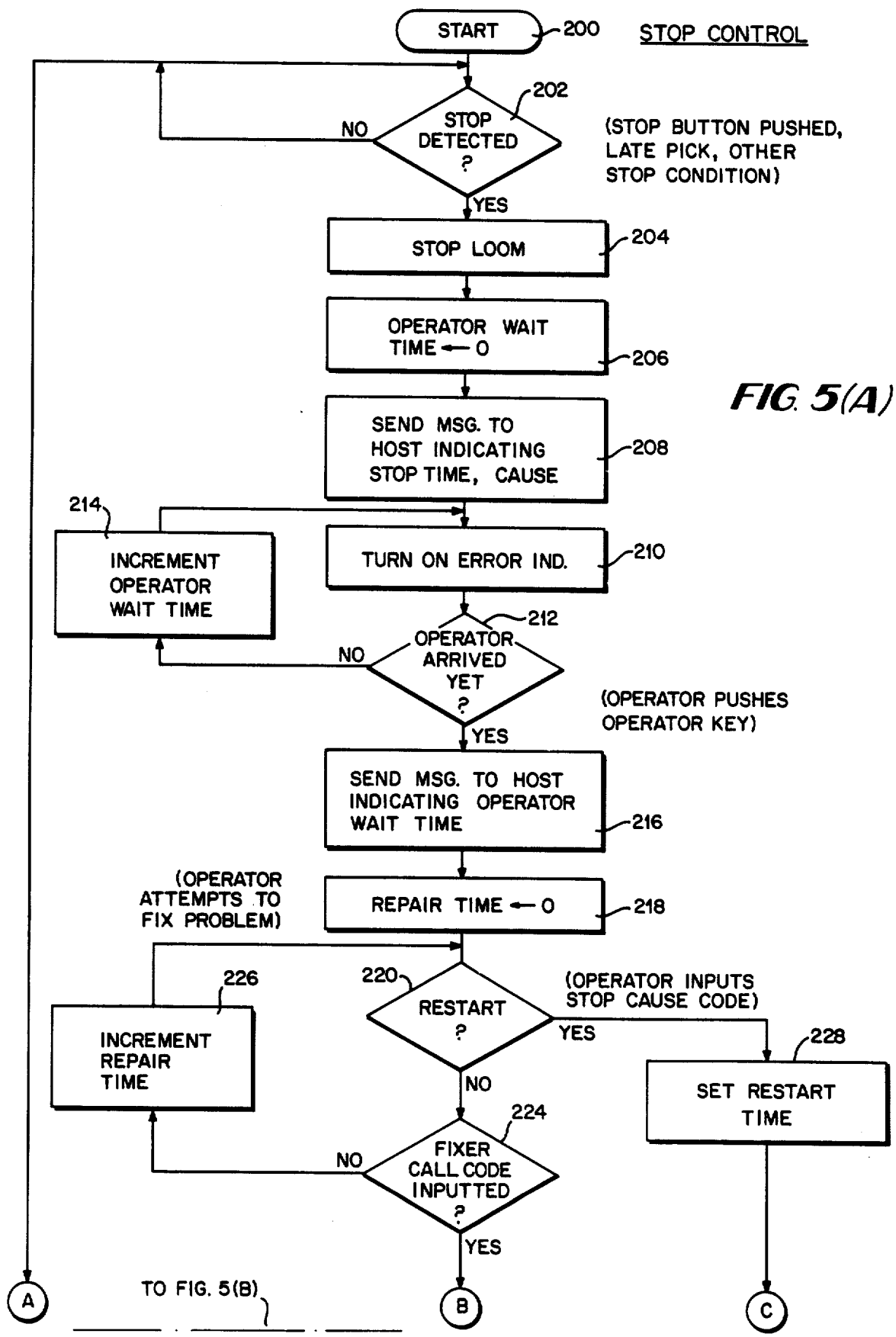
FIGS. 5A-5B together show a flow chart of exemplary program control steps performed by the on-board microcontroller shown in FIG. 4 to control loom starting and stopping.
Figure 5B:
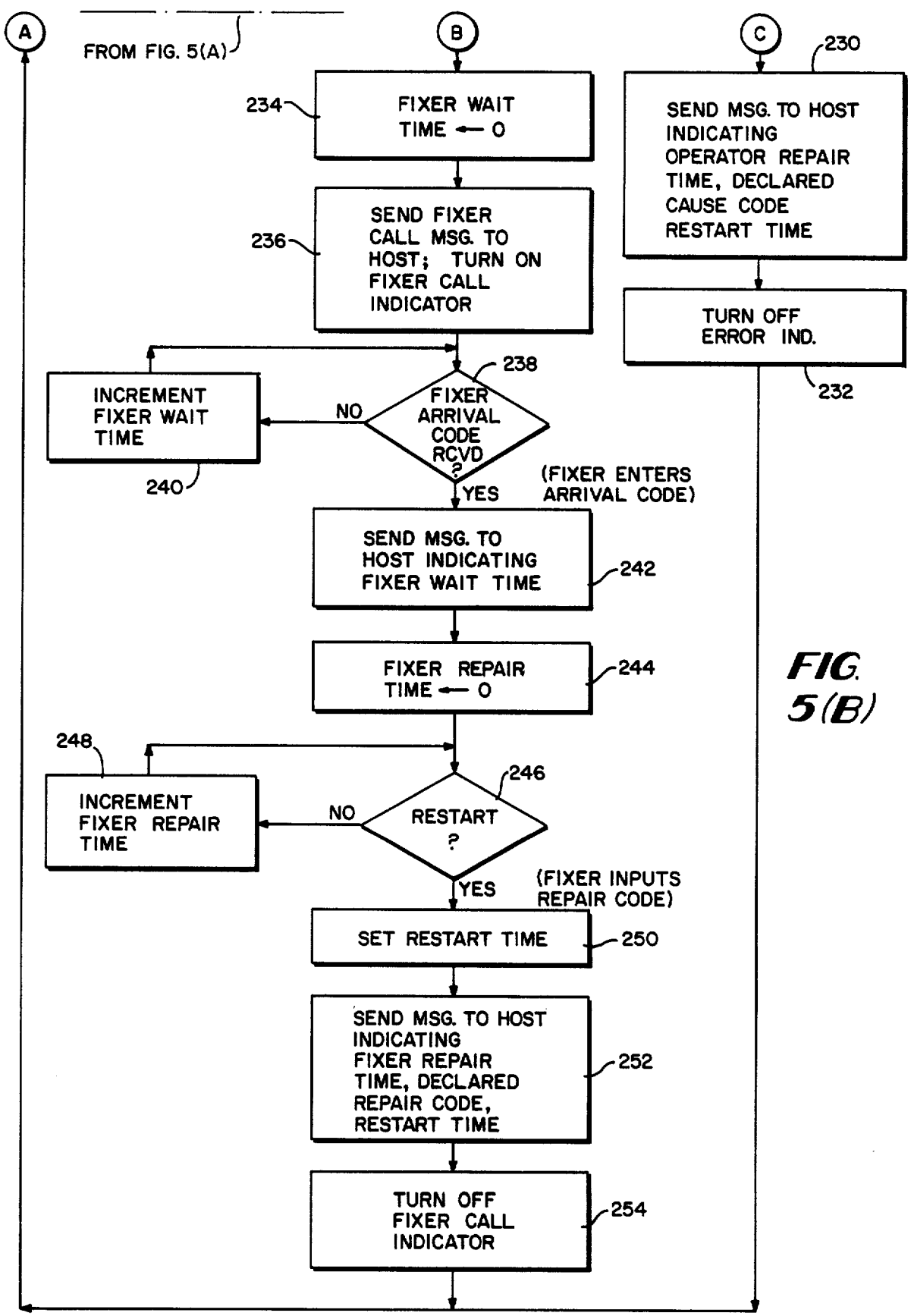

FIGS. 5(A) and 5(B) together are a flow chart of exemplary program control steps performed by loom microcontroller 72 to effect stop control over its associated loom 70. Flow is from top to bottom beginning at "start" block 200.

Loom 70 runs continuously, and loom microcontroller 72 continuously monitors the loom to detect a stop condition (decision block 202). Such stop conditions can occur for several different reasons. For example, the stop might be a manual stop (e.g., a person closes a hand switch or depresses a stop button at the loom) or an automatic stop (e.g., the loom needs to be doffed, the cloth needs to be cut, a pick arrives late, etc.).

Figure 6:
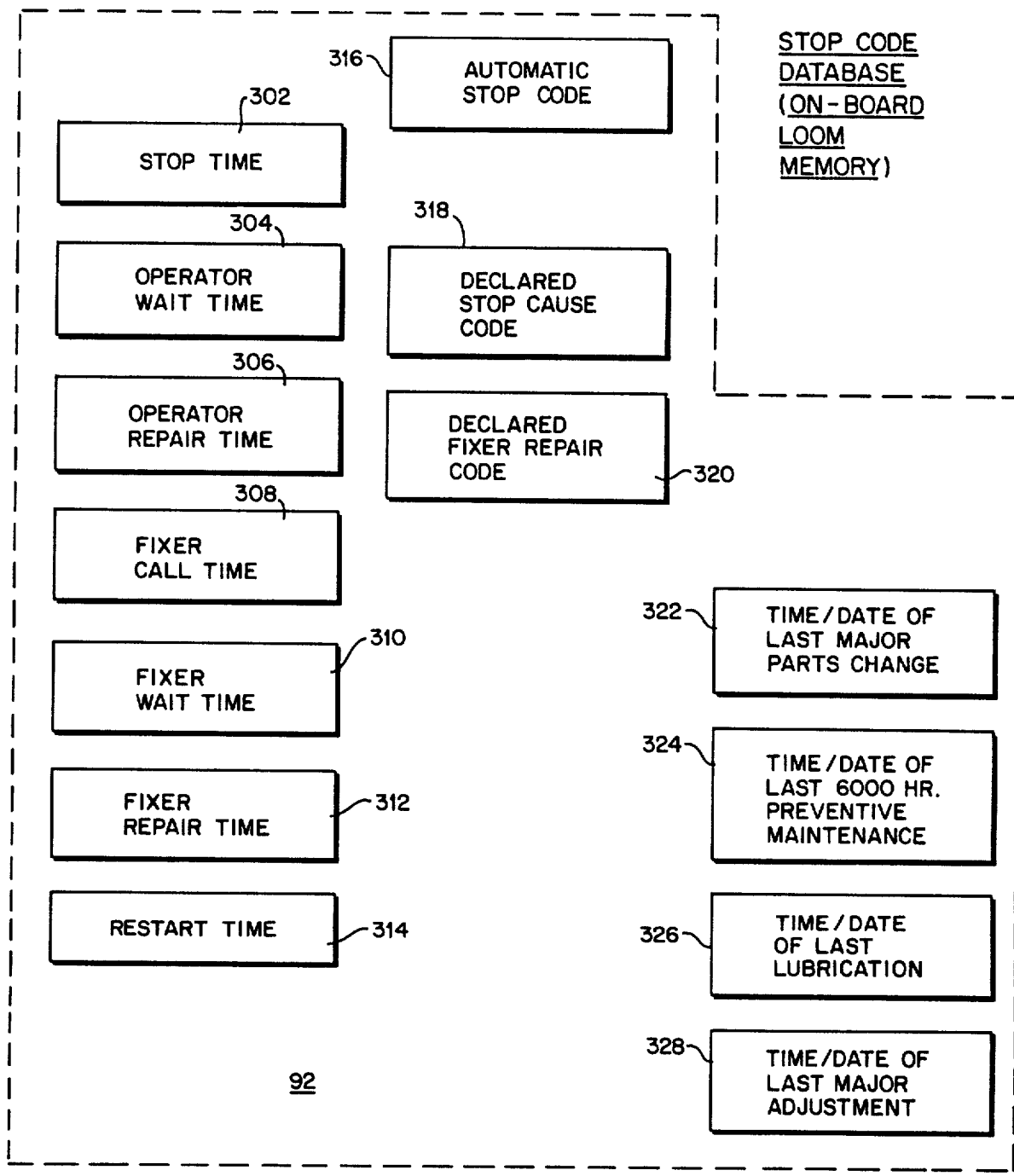
FIG. 6 is a schematic diagram of exemplary storage locations within the microprocessor memory shown in FIG. 4 used by the steps shown in the FIGS. 5(A) and 5(B) flow chart.

When loom microcontroller 72 detects a stop condition, it stops the loom (block 204) and performs several data manipulations (block 206). For example, loom microcontroller 72 stores the current real time (maintained in a real-time base within control microprocessor 90) into a storage location 302 called STOP TIME maintained within microprocessor memory 92 (see FIG. 6), stores a stop code indicating the reason for stoppage into a storage location 318 called AUTOMATIC STOP CODE, and resets a storage location 304 called OPERATOR WAIT TIME to 0. Loom microcontroller 72 then sends a message to central computer 52 ("host") indicating the stop time and the stop code (block 208).

FIG. 7(A) is a schematic diagram of an exemplary format for the message sent by loom microcontroller 72 at block 208. The message includes a loom number field (which contains a predetermined identification code assigned to the loom which has stopped); a stop time field which contains the contents of STOP TIME storage location 302; and an automatic stop cause field which contains the contents of the AUTOMATIC STOP CODE storage location 318. The message sent by loom microcontroller 72 at block 208 typically contains additional fields (e.g., a "header" field which indicates to central computer 52 that the central computer is the intended recipient of the message).

Loom microcontroller 72 then activates an error indicator (e.g., a lamp) indicating that the loom needs attention (block 210) and waits for an operator to arrive (decision block 212). While loom controller 72 waits for an operator to arrive, it continuously increments the contents of OPERATOR WAIT TIME storage location 304 (block 214)—keeping track of the length of time it takes for the operator to arrive at the stopped loom.

When central computer 52 receives the message sent to it by loom microcontroller 72 block 208, it alerts an operator (e.g., via a message displayed on a CRT) that the stopped loom needs attention.

When the operator arrives at the stopped loom, he or she depresses an operator key on the loom keyboard (as tested for by decision block 212), thus indicating to loom microcontroller 72 that loom repair is underway. In turn, loom microcontroller 72 sends a message to central computer 52 indicating that the operator has arrived and also including the values stored in the OPERATOR WAIT TIME storage location 304 (i.e., the length of time it took the operator to arrive at the loom—block 216). Loom microcontroller 72 then clears the contents of OPERATOR REPAIR TIME storage location 306 in preparation for timing how long it takes the operator to repair the loom (block 218), and then waits for a restart (decision block 220). Loom microcontroller 72 increments the values stored in OPERATOR REPAIR TIME storage location 306 while it waits for the operator to fix the problem (decision block 226).

If the operator is successful in fixing the problem and is able to restart the loom (block 220), the operator inputs a declared stop cause code into the loom keyboard to provide additional information describing the reason the loom stopped. Loom microcontroller 72 stores the current real time into a RESTART TIME storage location 314 (block 228), and sends a message to central computer 52 indicating the operator repair time, the declared stop cause code, and restart time (block 230). FIG. 7(C) is a schematic diagram of an exemplary format for the message sent by loom microcontroller 72 at block 230. The message sent at block 230 preferably includes a loom number field, an operator repair time field (which contains the data stored in OPERATOR REPAIR TIME storage location 306), a declared stop cause code field (which contains the value stored in DECLARED STOP CAUSE CODE storage location 318); and a restart time (which contains the value stored in RESTART TIME storage location 314). Loom microcontroller 72 then turns off the error indicator it activated at block 210 (block 232).

Sometimes, an operator is unable to fix the problem which causes the loom to stop. Operators have knowledge of weaving techniques and are able to fix many loom problems, but typically do not have sufficient skill or knowledge to replace worn out or broken parts or perform other technical services (e.g., lubrication). In a weaving plant, such major repairs to a loom are performed by a skilled technician called a "fixer." If the operator is simply unable to fix the stopped loom, he or she requests the services of a fixer by entering a fixer call code into the loom keyboard (as tested for by decision block 224).

When loom microcontroller 72 receives the fixer call code, it ceases timing operator repair time, initializes (clears) a FIXER WAIT TIME storage location 310 in preparation for timing how long it takes for a fixer to arrive (block 234), stores the current real time into a FIXER CALL TIME storage location 308, and then sends a fixer call message to central computer 52 (block 236). A schematic diagram of an exemplary fixer call message is shown in FIG. 7(D). As shown in FIG. 7(D), the fixer call message transmitted by loom microcontroller 72 at block 236 preferably includes a loom number field, a fixer call time field (which contains the values stored in FIXER CALL TIME storage location 308); and an operator repair time field which contains the values stored in OPERATOR REPAIR TIME storage location 306 (in this instance operator repair time is not an indication of the amount of time it took the operator to repair the loom, but rather, indicates how long it took the operator to diagnose that he or she could not repair the loom and that the services of a fixer were required). Loom microcontroller 72 also activates a visual indicator (e.g., a lamp) to attract the attention of a fixer (block 236).

When central computer 52 receives the message sent by loom microcontroller 72 at block 236, the central controller stores the information contained in the message into appropriate data bases and issues a fixer call (e.g., by causing one or more displays to display a fixer call message, and by sounding an audio and/or visual indication at the technician's station).

When the fixer arrives at the stopped loom, he or she inputs a fixer arrival code into the loom keyboard (as tested for by decision block 238). Loom microcontroller 72 continues to update the contents of FIXER WAIT TIME storage location 310 (block 240) until it detects that the fixer arrival code has been received. When the fixer arrival code is received, loom microcontroller 72 sends a message to central computer 52 indicating the accumulated fixer wait time (block 242). FIG. 7(E) is a schematic diagram of exemplary format for the fixer wait time message sent by loom microcontroller 72 at block 242. The fixer wait time message in the preferred embodiment includes a loom number field; and a fixer wait time field which contains a value stored in FIXER WAIT TIME storage location 310. After transmitting the fixer wait time message, loom microcontroller 72 clears the contents of FIXER REPAIR TIME storage location 312 in preparation for timing how long it takes the fixer to repair the loom (block 244).

Loom microcontroller 72 waits for the fixer to restart associated loom 70 (decision block 246), and it continues to increment the values stored in FIXER REPAIR TIME storage location 312 (thereby timing the duration between arrival of the fixer to the loom and restarting of the loom). When the fixer restarts the loom, he or she also enters a repair code into the loom keyboard which indicates the nature of the repair (e.g., parts changed, maintenance adjustment made, lubrication performance, etc.). When the loom is restarted, loom microcontroller 72 stores the current real time in RESTART TIME storage location 314, and stores the declared fixer repair code into a DECLARED FIXER REPAIR CODE storage location 320 (block 250). Loom microcontroller 72 then sends a message to central computer 52 indicating the fixer repair time, the declared fixer repair code, and the time of restart (block 252). A schematic diagram of an exemplary format for the message sent by loom microcontroller 72 at block 252 is shown in FIG. 7(F). This message includes a loom number field; a fixer repair time field (which contains the accumulated duration value stored in FIXER REPAIR TIME storage location 312); a declared repair code field (which contains the declaration inputted by the fixer and stored in the DECLARED FIXER REPAIR CODE storage location 320); and a restart time field (which contains the time stored in RESTART TIME storage location 314).

The data communicated to central computer 52 by loom microcontroller 72 through execution of the steps shown in FIGS. 5(A) and 5(B) can be used to monitor the efficiency of the people maintaining the looms as well as to diagnose when looms require maintenance or overhaul. For example, by collecting and storing the data contained in the messages shown in FIGS. 7(A)–7(C), the central computer 52 can determine how effective operators are at repairing certain kinds of problems, and can detect whether operators are slow in getting to looms or repairing looms. By collecting the information contained in the messages shown in FIGS. 7(D)–7(F), central computer 52 can automatically determine whether fixers are slow in getting to and/or repairing looms, and can also determine how effective particular fixers are (i.e., once a fixer repairs a loom, does the loom remain operational or does it break down soon thereafter). Reports generated by central computer 52 based upon such collected data can be used by management personnel to isolate operators or fixers who need retraining or discipline and also to award salary increases or other incentives to exceptional workers.

Figure 9:
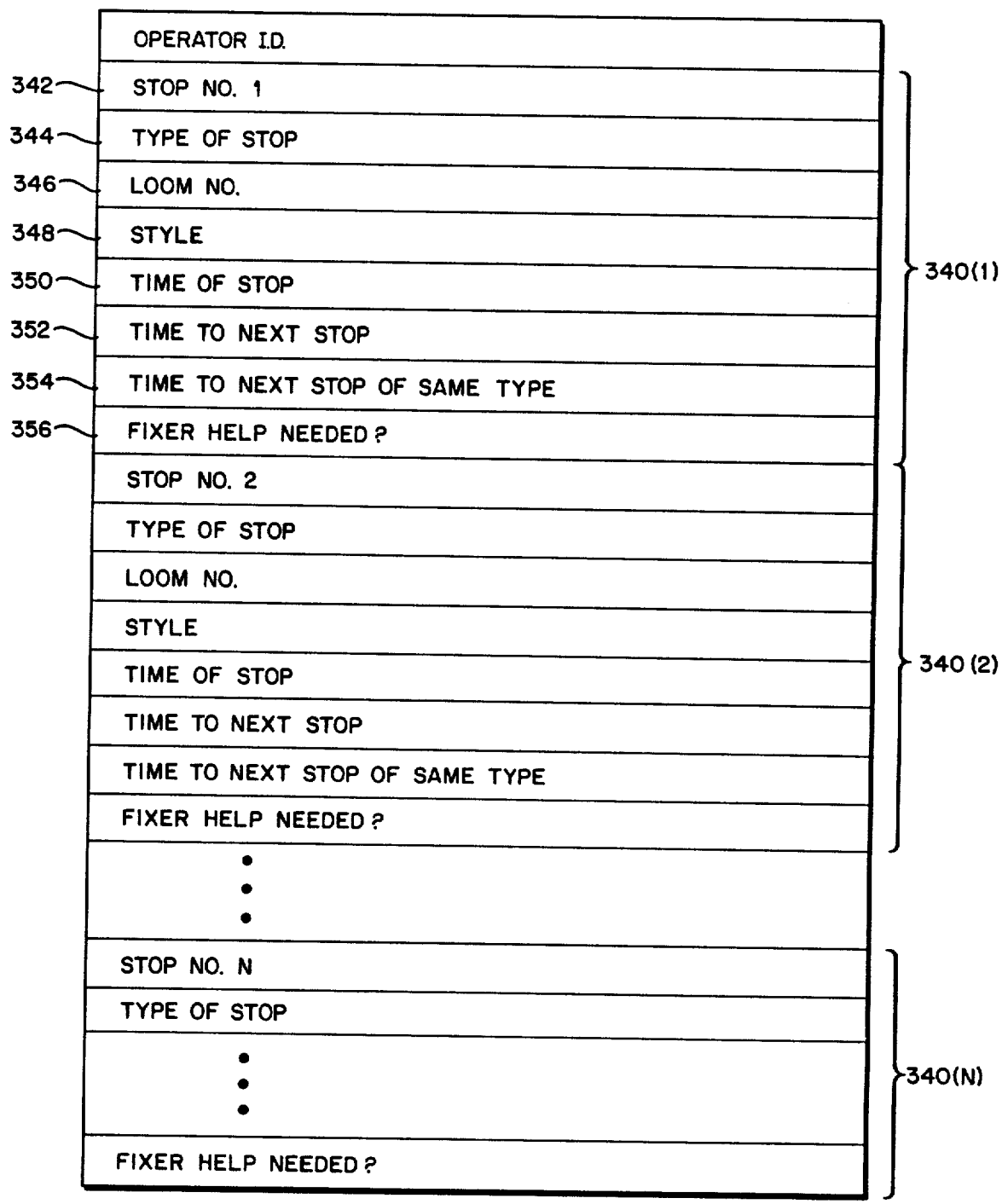
FIG. 9 is a schematic diagram of an exemplary operator effectiveness data base stored and maintained for each operator by the central controller of the preferred embodiment.

FIG. 9 is a schematic diagram of an exemplary operator effectiveness data base maintained by central computer 52 in response to the information gathered through receipt of the messages shown in FIGS. 7(A)–7(C). The data base shown in FIG. 9 includes, for example, a record 340 for each loom stop which is preferably filed or indexed by the operator responsible for attending to the loom. Each record 340 includes, in the preferred exemplary embodiment, a stop number field 342 (which identifies the stop by some convenient indicator such as time of stop, arbitrary stop number, etc.); a field 344 which indicates the type of stop (i.e., late pick, manual switch closure, or the like); a loom number field 346 which identifies the loom which stopped; a style field 348 (which specifies the style of cloth the loom was weaving when it stopped); a time of stop field 350 (which identifies the real time at which the loom stopped); a time to next stop field 352 (which central computer 52 calculates in response to the time the next stop was received); a field 354 which indicates (based on calculations performed by central computer 52) the time the next stop of the same type was received; and a field 356 indicating whether or not the services of a fixer were needed to restart the loom.

Central computer 52 stores a record 340 for each loom stop which occurs in system 50. Periodically (e.g., weekly, monthly), central computer 52 performs a statistical analysis to determine the effectiveness of each operator. For example, central computer 52 determines whether particular operators have more than an expected number or type of stop, and calculates the effectiveness of repair and/or average time to the next stop and average time to the next stop of the same type for each operator. Central computer 52 determines whether operator repair times are shorter or longer than expected using, for example, the Student's test (a conventional statistical analysis) with a criteria of plus or minus 3 sigma. Central computer 52 can also determine whether specific operators are relying too often on the services of a fixer. Deviation from normal expected stop levels by operator, normal production in picks by operator in style and normal expected quality can be correlated with and/or derived from the data base shown in FIG. 9 in conjunction with other collected data.

Based upon the analyses described above, central computer 52 periodically generates a report to weaving supervisors indicating those operators which have too many stops of a certain type, too many total stops, too many recurring stops of a certain type, too short an effective repair time, too many calls for a fixer, etc. Such reports can be useful in determining which operators need retraining and/or discipline and which operators should receive salary and other incentives for good on-the-job performance.

FIG. 10 is a schematic diagram of an exemplary fixer effectiveness data base maintained by central computer 52 in response to data received via the messages shown in FIGS. 7(D)-7(F). The fixer effectiveness data base shown in FIG. 10 in the preferred embodiment includes records 360 (preferably filed or indexed by the identification of the fixer involved) containing the following fields: a stop number field 362 (which contains a designation or identification of the stop); a stop type field 364 (which specifies the type of stop); a loom number field 366 (which identifies the loom which stopped); a style field 368 (which specifies the cloth style being woven by the loom when it stopped); a stop time field (which indicates the time at which the loom stopped); a fixer wait time field 372 (which indicates how long it took the fixer to arrive at the loom after being called by the operator); a fixer repair time field 374 (which specifies the amount of time needed by the fixer to restart the loom after arriving at the loom); a fixer repair type field 374 (which indicates the type of repair made by the fixer); additional fields 376, 378, 380 indicating additional information about the type of repair made (e.g., repair fix, parts changed, and other action required); next stop time field 382 (indicating the time until the next stop); and an additional field 384 (which indicates the time to the next stop of the same type).

Central computer 52 stores a record 360 for each loom stop occurring in system 50. Periodically (e.g., weekly, monthly, etc.), central computer 52 analyzes accumulated records 360 by fixer to determine the efficiency and effectiveness of the fixers servicing looms 70. For example, central computer 52 in the preferred embodiment analyzes the type of stops of looms repaired by each fixer to determine whether there are too many stops requiring a certain type of repair or too many stops requiring fixer services. Central computer 52 also calculates the effectiveness of repairs made by fixers by calculating the average time to the next stop of the same type, and determines if these times are statistically low or high using, for example, Student's test (with a criteria of plus or minus 3 sigma). Central computer 52 also analyzes records 360 to determine if fixers are changing too many parts (since such repairs, while often effective, are also very expensive).

Based on these analyses, central computer 52 periodically generates reports on printer 55 for use by weaving maintenance supervisors. These reports note which fixers have too many stops (total stops and/or stops of a certain type) within his or her assigned loom set, too many recurring stops of a certain type, or too short an effective repair time.

Central computer 52 also maintains a loom data base (which is shown in FIGS. 8(A) and 8(B)). The loom data base in the preferred embodiment includes a record 400 for each loom. Each record 400 contains a large amount of information relating to the operation and maintenance of the loom it corresponds to.

In the preferred embodiment, the loom data base stored by central computer 52 includes records 400 (one for each loom 70 within system 50). Each record 400 includes four sections: a loom identification field 402 (which identifies the loom the information contained within the record relates to); a repair log section 401 (which keeps track of maintenance and repair procedures which have been performed on the loom); a stop indicator section 411 (which in turn includes individual stop sub-records 411(1)-411(N) which contain information regarding different stops by the loom); a current status section 440 (which contains information relating to the current status and operating parameters of the loom); and a desired operating range section 463 (which includes fields identifying "in control" and "out-of-control" ranges for various weaving parameters).

Section 401 in the preferred embodiment includes, for example, a field 404 containing the date/time of the last major parts change; a field 406 containing the date/time of the last 6,000 hour preventive maintenance; a field 408 containing the date/time of the last lubrication; and a field 410 containing the date/time of the last major adjustment. Repair log information is gathered based upon the messages shown in FIGS. 7(A)-7(F) along with additional declarations ("flags" and other declarations) entered into the loom keyboards by fixers engaged in maintenance and repair. Periodically, central computer 52 statistically analyzes the repair log sections 401 by loom to isolate looms requiring more repairs, more parts of a certain type, increased frequency of adjustments, loss of lubrication, and the like. In addition, central computer 52 automatically schedules 6,000 hour preventive maintenance procedures for looms based upon the information contained in field 406, and automatically budgets for weaving room maintenance costs including parts and maintenance hours.

Loom stop sections 411 log a variety of information for each stop by loom, including stop number or other identification (field 412), cloth style at time of stop (field 414), loom operator at time of stop (field 416), shift at time of stop (field 418), fixer at time of stop (field 420), automatic stop code generated by the loom upon stoppage (field 422), declared stop cause code input by operator at time of stop (field 424), the length of time required to repair the loom (field 426), the action taken by the fixer (if any) at time of stop (field 428), warp number at the time of stop (field 430), cut number at time of stop (field 432), yardage from start of warp at time of stop (field 434), filling yarn lot identification (field 436), and filling package identification (field 438).

It will be noted that some of the information stored in stop sub-records 411 is redundant with information stored in the fixer effectiveness data base shown in FIG. 10 and/or the operator effectiveness data base shown in FIG. 9. It will be understood by those skilled in the art that such redundant information need not necessarily be expressly stored in more than one data base, but that instead, indexing or other conventional techniques can be used to cross-reference different data bases to reduce central computer storage requirements.

Central computer 52 periodically statistically analyzes the data stored in stop sections 411 of the loom data base shown in FIGS. 8(A) and 8(B) to determine various different useful parameters and predictions relating to the overall operation of specific looms and of all of the looms in system 50. For example, central computer 52 in the preferred embodiment periodically analyzes this data by loom, by weaver, by fixer, by shift, by warp, by filling lot, etc. to identify out-of-control exceptions and possible causes (for example, this technique can be used to isolate a defective filling yarn lot). Central computer 52 uses normal Student's t and F statistical tests to identify mean levels of stops that are out of control, and identifies both positive and negative trends using, for example, the least squares technique. Central computer 52 calculates average values over different periods of time to provide additional useful information which can be printed out in reports and used by supervisors or analysts to recommend improvements which will increase the efficiency of system 50 and the overall quality of the cloth being produced.

The loom data base of the preferred embodiment also includes a current information section which can be used to determine and/or predict the quality of the cloth currently being produced by each loom 70 of system 50. Current information section 440 includes, for example, an identification of loom beam (field 442), current filling package identification (field 444), current filling package lot (field 446), current operator (field 448), current fixer (field 450), current supervisor (field 452), current shift (field 454), time since the last cloth style change was effected (field 456), time since the loom was last repaired (field 458), declared stop cause of last stop (field 460), and the current style of cloth being produced (field 462). In addition, additional fields (not shown) may be provided in the preferred embodiment to store various information relating to the quality of the product being produced which may be declared from time to time by roving inspectors (for example, a roving inspector might declare a comment or a code relating to the quality of the cloth being produced by a specific loom by simply entering such information into the loom's local keyboard—this declared information is transmitted to central computer 52 by loom microcontroller 72, and is stored as part of loom data base 400.

Periodically, central computer 52 analyzes the current information section 440 of the loom data base for each loom, and determines and/or predicts the overall quality of the cloth being produced by the loom. The exact calculations used to predict quality of the woven product may be empirically arrived at and may depend to a large extent on variables specific to a given system (e.g., the expertise of the operator, the quality of the looms being used, and the quality of the yarn lots being used to weave the cloth). In the preferred embodiment, central computer 52 arrives at a predicted quality factor by summing points received for the quality of the warp being used (i.e., slashing performance), the number and types of stops occurring while the cloth is being woven, the comments (declarations) of the roving quality inspectors inputted during weaving, the overall performance of the particular style being woven, and effect on quality of any out-of-control situation which occurred during weaving. This quality prediction analysis can be used, for example, to abort a weaving process by a particular loom if it appears (e.g., based on the discovery of deleterious statistical trends) that the resulting product will have inferior quality.

For example, if a loom is out-of-control and certain other criteria are violated (for example, too much time has passed since the last preventive maintenance procedure was performed, reed age is excessive, etc.), an exception message may be printed on printer 55 and/or displayed on display 54 to alert the supervisor and/or operator that an inferior quality product is probably being produced. If extremely high quality is critical to a certain customer or for a certain style, central computer 52 may automatically stop the loom (by transmitting a stop message to the loom microcontroller 72 via communication network 66) and request human intervention.

REAL-TIME INTERACTIVE OPTIMIZATION OF LOOM INDEPENDENT WEAVING VARIABLES

As mentioned previously, system 50 is capable of optimizing, interactively in real time, the so-called programmable (F) functions (independent weaving variables) of looms 70 based on software programming.

Filling arrival time is an example of one such independent weaving variable. Filling arrival time is a function of main air nozzle pressure and pick release timing degrees. Each of looms 70 in the preferred embodiment includes one or more control(s) (e.g., valves) in switches/actuators array 84 shown in FIG. 4 which can increase or decrease main air nozzle pressure over a limited range. Desired main air nozzle pressure is a proportional value that is related to the style of cloth being woven as well as to pick release timing degrees. Thus, in the so-called loom "insertion system", filling arrival time is a function of when the pick is released, how much air is inserted at the insertion nozzles, and the timing of these insertions. All timings are measured in degrees of rotation of the loom crankshaft (sensed by crank angle sensor 94 shown in FIG. 4).

Filling arrival time is controlled according to the following control function in the preferred embodiment:

$$(X\ actual - X\ target)K = P\ target$$

where X actual is the measured arrival time in degrees, X target is the desired arrival time in degrees for the particular style of cloth being woven, P target is the desired pressure set point, and K is a preset proportionality constant developed by running an experiment of P versus X and using the standard regression equation $Y = ax + b$ to determine slope (K).

In the preferred embodiment of system 50, loom microcontrollers 72 continuously collect data specifying nozzle air pressure and insertion timing. Loom microcontrollers 72 collect an array of such data for every 100 sequential picks, and then calculate an average and standard deviation. If the standard deviation of arrival time is too high, a fixer is called to repair the loom. If the average arrival time is statistically low or high, then the preferred embodiment automatically raises or lowers the air pressure to the main nozzle appropriately. If main nozzle pressure falls outside of predetermined limits, and resulting arrival times are still out-of-control, a message is sent to a fixer to go to the loom and repair it.

Figure 11A:
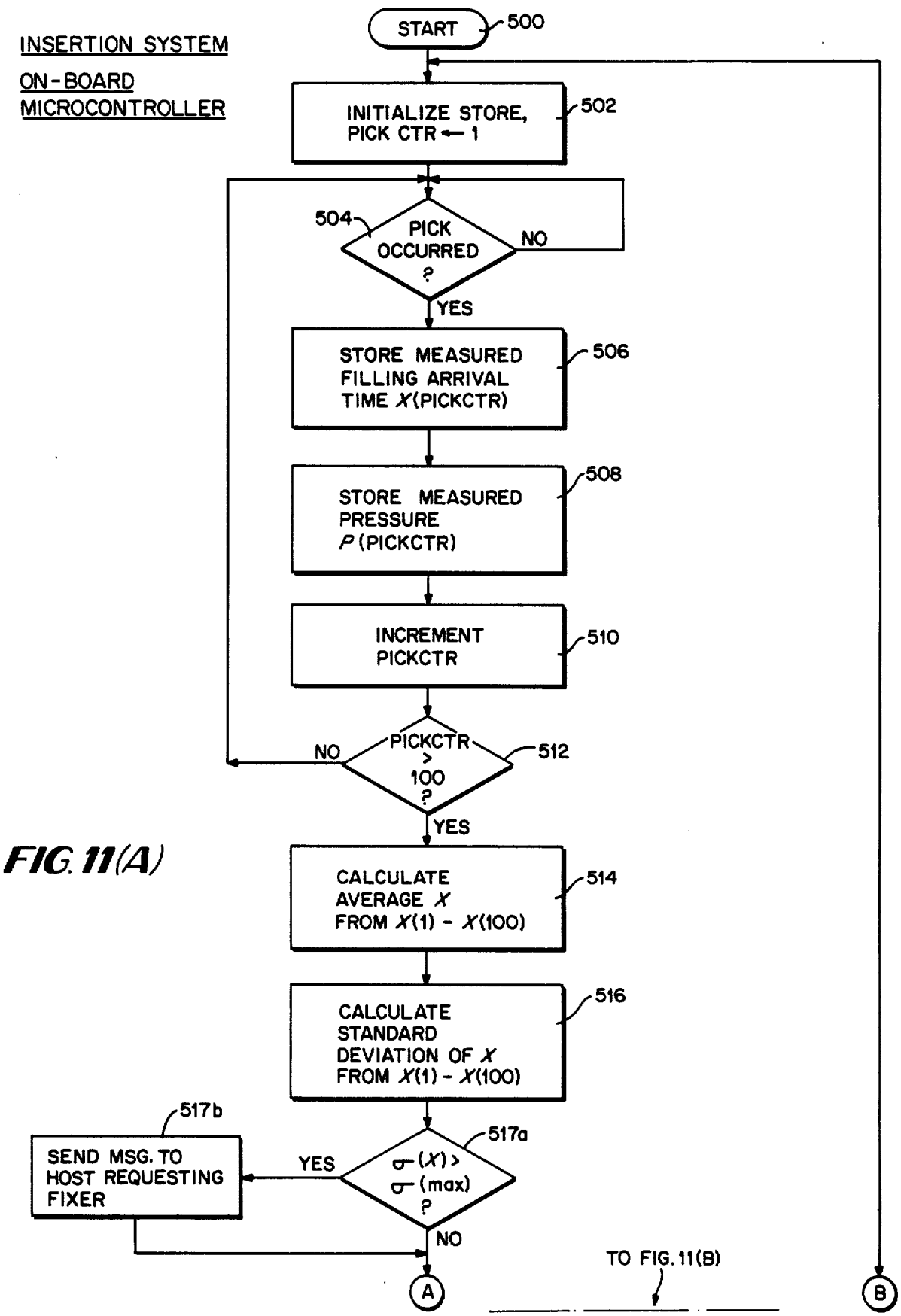
FIGS. 11(A) and 11(B) are together a flow chart of exemplary program control steps performed by a local on-board loom microcontroller of each loom in the system of the present invention in order to monitor insertion.
Figure 11B:
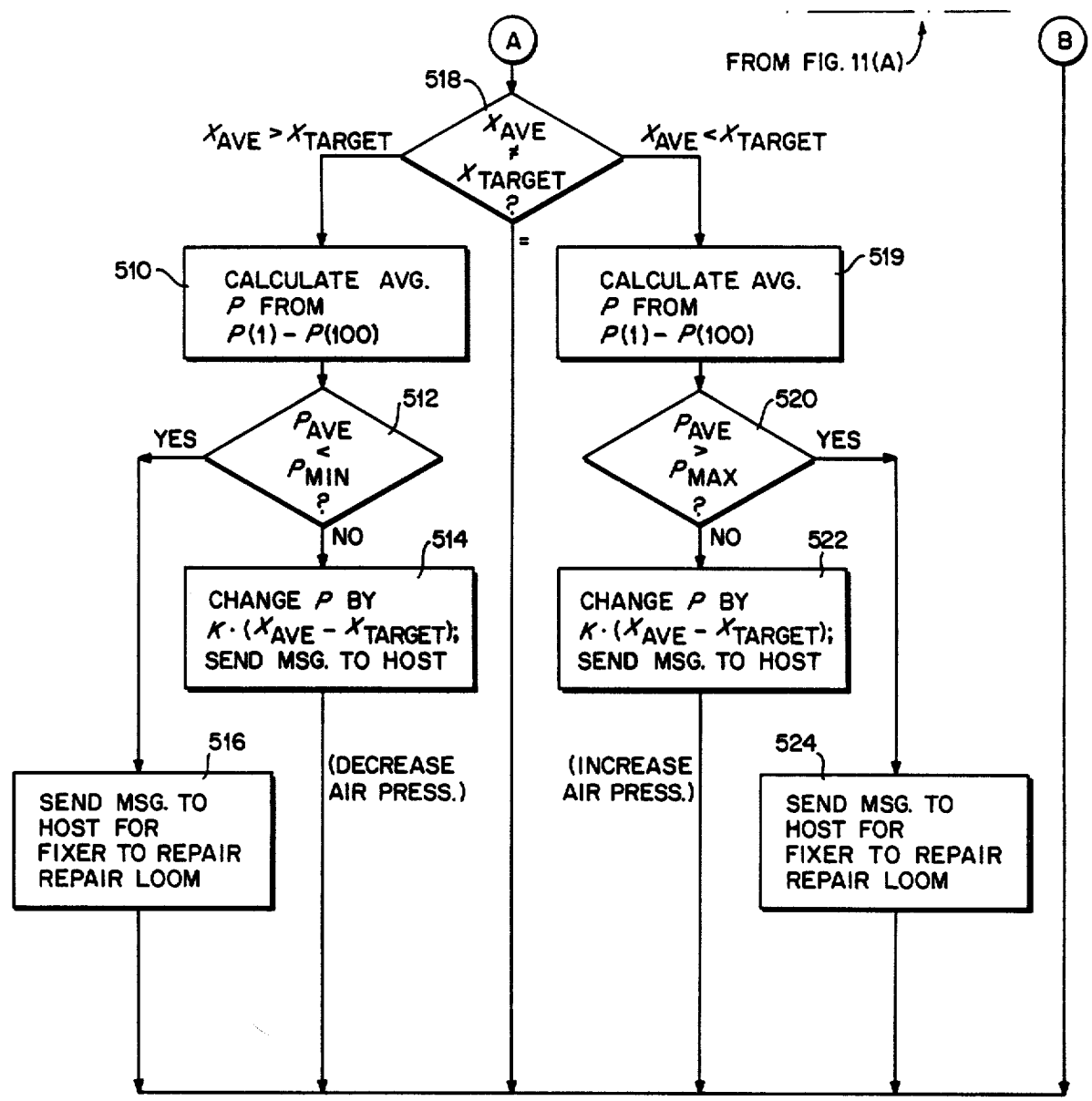
Figure 12:
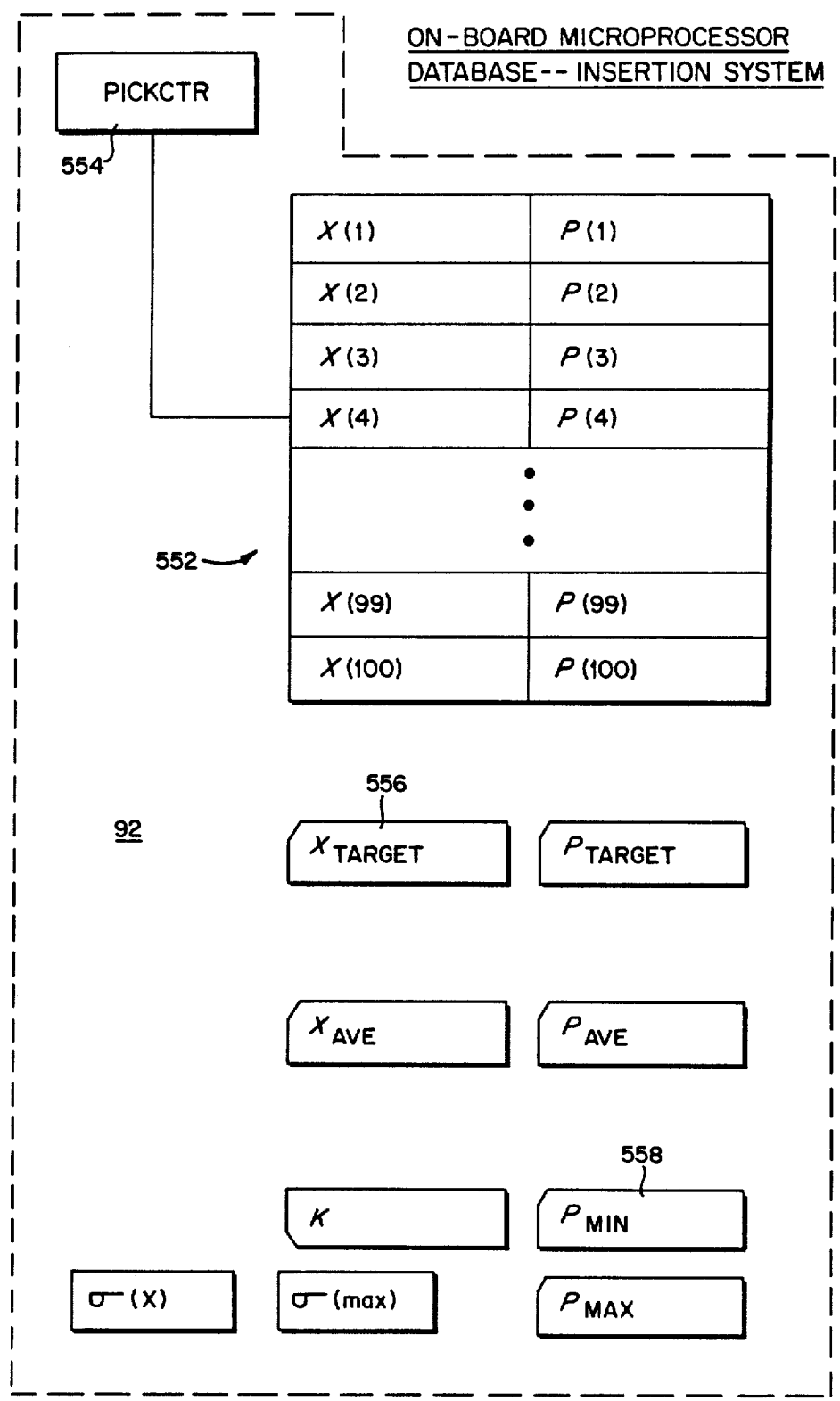
FIG. 12 is a schematic diagram of exemplary storage locations used by the program control steps shown in FIG. 11 and maintained in the memory associated with the on-board loom control microprocessor.

FIGS. 11(A) and 11(B) are together a flowchart of exemplary control steps performed by loom microcontroller 72 to monitor the loom insertion system. FIG. 12 is a schematic illustration of storage locations within loom microcontroller memory 92 which are used by the control steps shown in the FIG. 11 flowchart, and FIG. 13 is a schematic illustration of a loom insertion system data base maintained by central computer 52 and used by the central computer (and/or indirectly by loom microcontrollers 72) to control the loom insertion system.

Loom microcontroller 72 first initializes various storage locations within memory 92 which relate to insertion system monitoring and control (block 502). For example, loom microcontroller 72 maintains an array 552 of measured arrival time X in degrees and measured nozzle air pressure P for each of 100 sequential picks. This array 552 is indexed by a counter PICKCTR 554. Before insertion system monitoring can begin, array 552 should be cleared and PICKCTR 554 should be reset to index the first element in the array (array element 1 in the preferred embodiment).

Loom microcontroller 72 then waits for a pick to occur (block 504). When a pick does occur, loom microcontroller 72 senses and stores measured arrival time in location X(PICKCTR) of array 552 (block 506) and senses and stores measured nozzle pressure in storage location P(PICKCTR) of the array (block 508) (e.g., X(1), P(1) for the first pick, X(N), P(N) for the Nth pick). The index counter PICKCTR 554 is then incremented in preparation for the next write to the array (block 510).

Blocks 504-510 are executed once for each pick until array 552 is filled (i.e., after 100 sequential picks). When 100 sequential picks have occurred since the last analysis (tested for by decision block 512), loom microcontroller 72 calculates the average arrival time X from the value stored in array locations X(1) through X(100) (block 514), and also calculates the statistical standard deviation of X from those same array values (block 516).

If the average X and/or the standard deviation of X falls outside of tolerance (tested for by decision block 518 based upon programmable out-of-range limits), corrective action is taken by loom microcontroller 72. For example, if the standard deviation of X exceeds a predetermined standard deviation sigma (max) (as tested for by block 517a), loom microcontroller 72 sends a message to control computer 52 requesting a fixer (block 517b)—since loom operation is out-of-control and the loom must be adjusted.

If the average arrival time exceeds a predetermined target arrival time Xtarget stored in storage location 556 (this value is down loaded from central computer 52 when a new style change is effected), loom microcontroller 72 calculates the average nozzle pressure P from the measured pressure values stored in array locations P(1)-P (100) (block 510). If the calculated average pressure value is already less than a predetermined minimum value (stored in storage location 558 and down loaded from central computer 52 at the last style change) (as tested for by decision block 512), and it is not possible to decrease air pressure further in order to decrease filling arrival time, a message is sent to central computer 52 requesting fixer to repair the loom (block 516). If, on the other hand, nozzle pressure can be reduced without causing average nozzle pressure to fall below the Pmin minimum pressure value stored in storage location 558 (tested for by decision block 510), nozzle pressure is adjusted (via switches/actuators 84 shown in FIG. 4) to decrease nozzle pressure by an amount, as one example, corresponding to K (Xaverage—Xtarget). (Block 514). In addition, loom microcontroller 72 sends a message to central computer 52 informing the central computer that nozzle pressure has been decreased (also block 514). Similar corrective action (to increase air pressure) is taken by blocks 518-524 in the event that arrival time is less than Xtarget.

The loom insertion data base shown in FIG. 13 (which may, if desired, be part of the loom data base shown in FIGS. 8(A) and 8(B), but has been shown separately in FIG. 13 for ease of explanation) monitors the various insertion system parameters for each loom in system 50. The FIG. 13 loom insertion data base in the preferred embodiment includes records 602 each of which store information for a particular cloth style and number. In the preferred embodiment, records 602 each include the following information: style of cloth (field 604), loom number (field 606), main nozzle serial number (field 608), reed type, serial number and age (field 610), number of warp ends (field 612), filling type designation (field 614), target air pressure Ptarget (field 626), maximum allowable air pressure Pmax (field 618), minimum allowable air pressure Pmin (field 620), the proportionality constant K for the style of cloth being woven (field 622), target arrival time Xtarget (field 614), maximum allowable arrival Xmax (field 626), minimum allowable arrival time Xmin (field (628), maximum allowable standard deviation of X (field 630), and average air pressure used by the hour, day, week and month (fields 632-638). The FIG. 13 data base is used to download information to loom microcontroller memory 92, and also to provide analysis and optimization of insertion systems for various looms by loom, cloth style and the like.

AUTOMATIC CHANGE OF LOOM SET-UP PARAMETERS

System 50 is also capable of automatically, electrically changing loom set-up parameters to effect a change of cloth style. In the past, set-up parameters had to be manually entered individually at each loom by the style change crew—a very time-consuming and tedious process. In the preferred embodiment of the present invention, central computer 52 causes style changes to occur automatically by down loading, to the loom microcontroller memory 92, predetermined set-point values stored in the central computer for the new style to be woven. Central computer 52 maintains current set-up values for independent weaving variables by style, and also keeps track of how many picks have been performed by each loom 70 of system 50 (and thus, how many picks need to occur before a style change should be implemented for each loom).

Central computer 52 automatically alerts a style change crew to set looms up for style changes when a style change becomes necessary. When the style change crew enters the style change code at the loom indicating that the loom is ready to begin weaving the new style of cloth, central computer 52 automatically communicates independent weaving variables corresponding to the new style (including new dobby control variables if an electronic dobby is used) to the loom microcontroller 72. The loom microcontroller effects these changes automatically, electrically, and instantly (thus reducing down time and increasing production rate).

In addition, central computer 52 of the preferred embodiment optimizes set-up for particular loom and style combinations through the use of statistical techniques. A data base is maintained which stores independent style set-up information by loom number, allowing an operator to change (optimize) set-up values slightly for particular looms in order to improve product quality.

Figure 14:
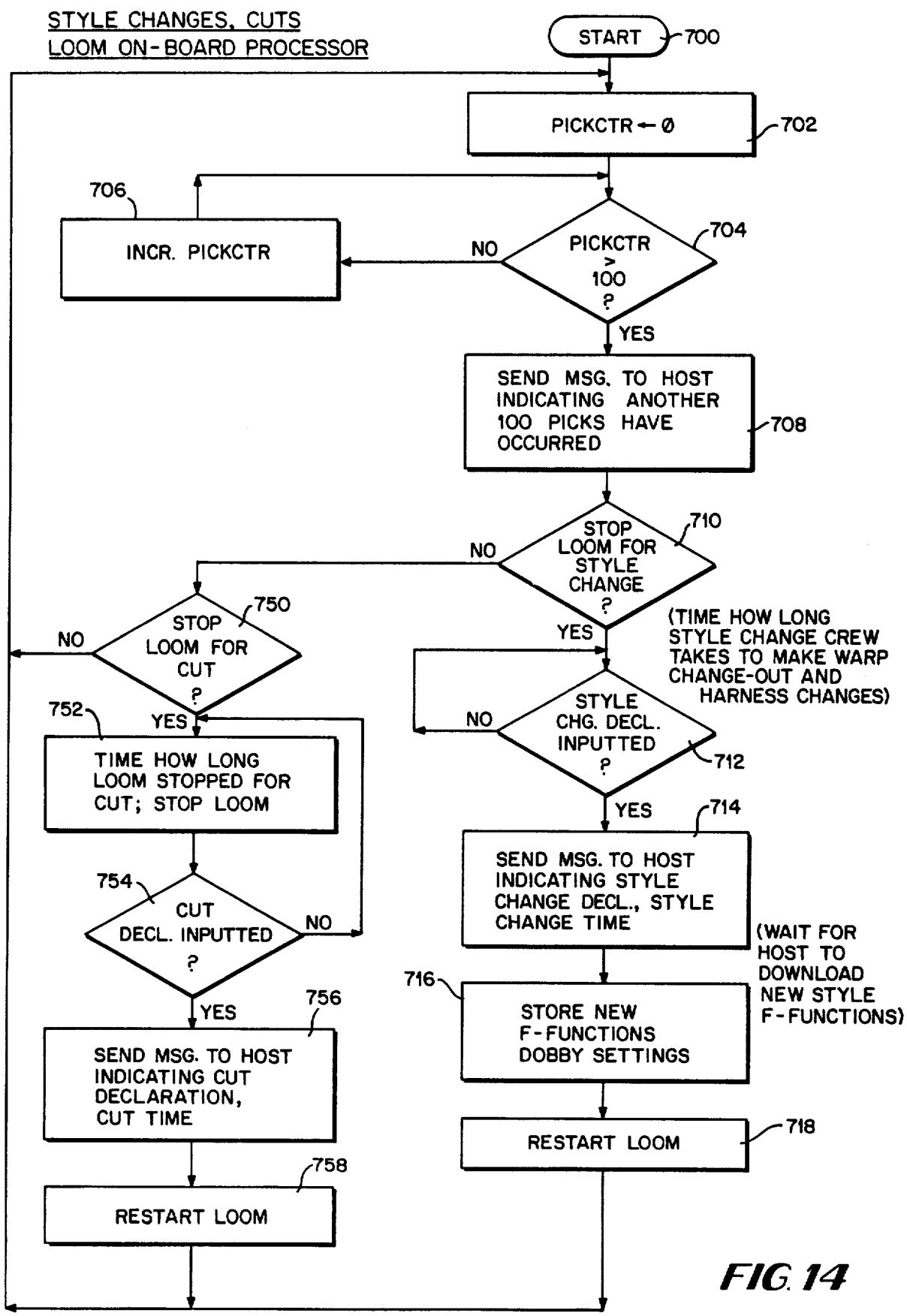
FIG. 14 is a flow chart of exemplary program control steps performed by the local loom on-board processor of the preferred embodiment to effect style changes and fabric cuts.
Figure 15:
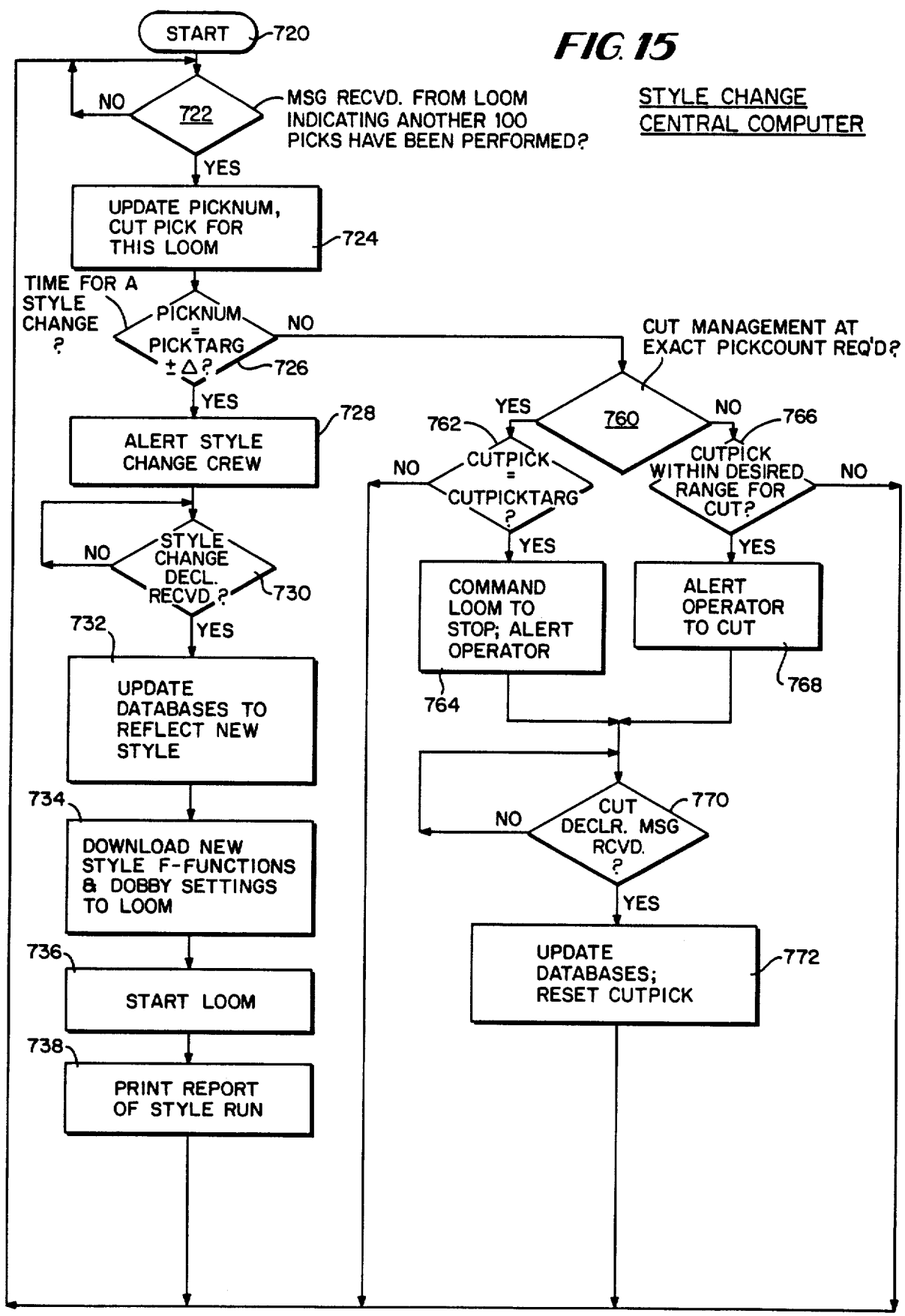
FIG. 15 is a flow chart of exemplary program control steps performed by the central controller of the preferred embodiment to effect style changes and fabric cuts.

FIG. 14 is a flow chart of exemplary program control steps performed by loom microcontroller 72 in order to monitor the need for and to effect a style change (and also to monitor the need for and effect a cut doff, as will be explained). FIG. 15 is a flowchart of exemplary program control steps executed by central controller 52 to monitor the need for and effect a style change on a specific loom (and also to monitor the need for and effect a cut doff). FIG. 16 is a schematic diagram of an exemplary style set-point data base maintained by central computer 52, and FIG. 17 is a schematic diagram of an exemplary style change data base maintained by the central controller.

Loom microcontroller 72 continuously monitors the number of picks its associated loom 70 performs (blocks 702–706), and sends a message to central computer 52 indicating whenever 100 picks have occurred (i.e., approximately every sixteen seconds) (block 708). Central computer 52 updates, in the loom data base shown in FIG. 8B, a field 464 indicating the number of picks performed since the last style change (PICKNUM), and compares this number with the desired number of picks to be performed for this style (PICKTARG, stored in field 466 of the loom data base shown in FIG. 8B).

Central computer 52 updates the value stored in field 464 each time it receives a message from loom microcontroller 72 at block 708 (decision block 722, block 724 shown in FIG. 15). Central computer 52 then compares the contents of fields 464, 466 stored in the FIG. 8B loom data base to determine when the loom is within a management selectable number of picks from the target number of picks PICKTARG to be performed for the current style (decision block 726). If central computer 52 determines on this basis that it is time for a style change, it alerts the style change crew (block 728) by, for example, issuing a message to be displayed on a video display station. The loom can be stopped for style change either by direct control from central computer 52 (if exact pick count is desired) or manually when the style change crew arrives at the loom (decision block 710, FIG. 14).

When the style change crew arrives at the loom, it may declare its arrival by entering a code into the loom keyboard (so that the amount of time it takes for the style change crew to arrive and the amount of time it takes for the style change crew to effect a style change can be measured by loom microcontroller 72 and reported back to central computer 52 much as operator and fixer wait and repair times are collected as described previously). The style change crew then implements the style change by making the required warp change-out and harness changes. Then, one of the people in the style change crew enters a specific declaration code into the loom keyboard (decision block 712, FIG. 14), which causes loom microcontroller 72 to transmit a message to central computer 52 indicating the style change declaration and the time of the style change (block 714).

When central computer 52 receives the style change message transmitted to it by the loom microcontroller 72 (decision block 730), it updates the loom data base shown in FIGS. 8(A) and 8(B) (and also the style change data base shown in FIG. 17) to indicate the new style (block 732)—obtaining the new style information from a scheduling file it maintains (see FIG. 16) and/or from human interaction.

Central computer 52 maintains a style set point data base 800 (see FIG. 16) including a record 802 for each different cloth style supported by system 50. Each style record 802 includes designation of style number (field 804), a list of independent weaving variables (so-called F functions) stored in field 806, a list of electronic dobby settings for looms equipped with electronic dobbies (field 808), and various values for acceptable performance criteria and ranges corresponding to the particular style (e.g., Xtarget, Ptarget, and the like) in field 810. Central computer 52 downloads the new style F-functions and dobby settings corresponding to the new style to loom microcontroller 72 by reading the contents of field 806, 808 from the appropriate record 802 of the FIG. 16 database and transmits these values in the form of a message to the loom microcontroller (block 734). Various parameters stored in field 810 of the appropriate record 802 of the FIG. 16 database are also down loaded to the loom microcontroller (and/or stored in the appropriate databases maintained by central computer 52). These down loaded F function values, dobby settings and other parameters are stored into memory 92 of loom microcontroller 72 and used to control the weaving variables of the loom during subsequent weaving (block 716).

Central computer 52 may then issue a command to loom microcontroller 72 to restart (block 736), to which the loom microcontroller responds by restarting the loom (block 718, FIG. 14). After the style change is completed, central computer 52 updates a style change database (shown in FIG. 17) which includes a record 900 for each style run by each loom. Record 900 includes the following information in the preferred embodiment: designation of style (field 902), designation of loom (field 904), a list of the F functions last down loaded to the loom (along with a list of electronic dobby settings and other style setting dependent variables) (field 906), an indication of the time the style set point for the loom was last changed (908), an indication of the next time (pick number) the style set point for the loom should be changed (field 910), the number of stops occurring in this style (CMPX) (field 912), the number of filling stops occurring during this style (per CMPX) (field 916), and person (crew) who made the last style change (918).

After a style change for a loom is completed, central computer 52 creates a new record 900 corresponding to the new style, and prints out a report indicating the parameters stored in record 900 corresponding to the old style/loom combination. Such reports can be used by a process engineer or management to optimize style set-up parameters in the database and to provide other useful information.

CUT HANDLING

Cut length (i.e., the number of picks on a cut or piece) can be controlled precisely in the preferred embodiment of the present invention of system 50. Some customers require exact cut lengths, and the preferred embodiment is capable of automatically stopping looms for a cut doff at the exact number of picks required by the customer. If precise cut lengths are not required, central computer 52 can optimize cut length based on the length of the loom beam supplied from slashing (e.g., to reduce waste).

FIG. 14 includes steps 750–758 performed by loom microcontroller 72 to effect cut management, while FIG. 15 includes steps 760–772 performed by central computer 52 for cut management. When central computer 52 receives the pick count update message transmitted by loom microcontroller 72 (blocks 708, 722), and assuming that no style change is required, the central computer determines whether cut management at an exact pick count is required by reading the value of a field 470 contained within the FIG. 8(B) loom database which was specified when the style run began.

If cut management at an exact pick count is required (decision box 760), then central computer 52 compares the number of picks performed since the last cut doff (cutpick, stored in field 472 in the FIG. 8(B) database) with the predetermined value CUTPICKTARG which indicates how many picks should occur before a cut doff (this value is stored in field 474 of the FIG. 8(B) database). If decision block 762 determines based upon this comparison that a cut doff is required, central computer 52 sends a message to loom microcontroller 72 controlling the loom microcontroller to stop the loom, and alerts an operator (e.g., by displaying a video message) that a cut doff is required (block 764).

When loom microcontroller 72 receives the command to stop for a cut (decision block 750, FIG. 14), it stops the loom and times how long the loom is stopped (thus provided a measure of how rapid the operator is able to doff). Loom microcontroller 72 may likewise measure how long it takes for an operator to arrive at the loom by requiring the operator to enter an arrival declaration upon arrival at the loom as described previously in connection with stop control.

When the operator completes the cut doff, he or she enters a declaration code to that effect via the loom keyboard, which is sensed by the loom microcontroller (decision block 754) and transmitted to central computer 52 along with the time the cut occurred (block 756). When central computer 52 receives the cut declaration message (decision block 770, FIG. 15), it updates the loom database (e.g., the value CUTPICK stored in field 472, FIG. 8(B) database) and issues a command to restart the loom (block 772). Alternately, the operator may simply manually restart the loom as desired.

Even if cut management and exact pick count is not required, it is desirable to perform cut doffs periodically to optimize efficiency and fabric quality and to reduce waste. Central computer 52 tests whether the number of picks since the last cut was in a range indicating doffing should occur (decision block 766, FIG. 15), and alerts an operator to perform the cut if necessary (block 768).

Central computer 52 may not control the loom microcontroller 72 to stop loom 70 at this time, since it is not absolutely critical that a doff be performed at a specific pick count. Alternatively, loom microcontroller 72 may stop the loom and then, if no doff occurs within a predetermined period of time (e.g., five minutes) restart the loom again (while still producing a visual indication that doffing is required) to prevent the loom from remaining idle for too long. The value of CUTPICKTARG can be adjusted interactively by an operator (or through automatic analysis by central computer 52) in order to optimize when doffing occurs— —and the number of picks at which doffing actually does occur can be recorded to provide data for this optimization process.

A similar, somewhat simpler process is used to detect when a filling packet transfer is required. Looms 70 in the preferred embodiment each include a photoelectric device 99 (see FIG. 4) which detects each filling package transfer. Loom microcontroller 72 sends a message to central computer 52 indicating when a new filling package is required. Central computer 52 either automatically controls an automatic filling package delivery system to deliver the new filling package, or alerts a person that a new filling package is required.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A distributed real-time interactive textile weaving machine control system of the type controlling a plurality of textile weaving machines, said system comprising:

plural local real time monitoring and control digital signal processing means, disposed at and associated with plural corresponding weaving machines, for continually monitoring the operation of said weaving machines in real time and for automatically controlling said weaving machines in real time in response to said monitored operation;

a further digital signal processor;

data signal communicating means, operatively connected between said local processing means and said further processor, for communicating, in real time, signals indicating said monitored operation from each of said local digital signal processing means to said further digital signal processor and for communicating, in real time, digital control signals generated by said further processor to said local processing means;

said further processor including signal processing means for comparing, substantially in real time, said communicated indicating signals with predetermined normal values and for generating a control signal specifying at least one independent weaving parameter if said comparison reveals a substantial difference between said normal values and said signals communicated by the local processor means associated with a weaving machine;

said further processor also including means for transmitting said control signal to the local processing means associated with said weaving machine for which said substantial difference was revealed via said data signal communicating means;

said local processing means associated with said weaving machine optimizing the operation of said weaving machine in response to said transmitted control signal.

2. A method of controlling a plurality of textile weaving machines comprising:

(1) continually monitoring the operation of each of said plurality of weaving machines in real time;

(2) automatically controlling, in real time, said weaving machines with local digital signal processors disposed at and associated with each said weaving machine in response to said monitored operation;

(3) transmitting, in real time, signals indicating said monitored operation from each of said local digital signal processors to a further digital signal processor communicating with each of said local processors;
(4) comparing said indicating signals at said further processor substantially in real time with predetermined normal values and, if said comparison reveals a substantial difference between said indicating signals associated with a weaving machine and said normal values, generating a control signal specifying at least one independent weaving parameter;
(5) transmitting said control signal to the local processor associated with said weaving machine for which said substantial difference was revealed; and
(6) optimizing the operation of said weaving machine substantially in real time in response to said control signal.

3. A method of controlling a textile weaving machine comprising:
  (1) continually monitoring the operation of a weaving machine;
  (2) in response to said monitored operation, automatically controlling said weaving machine with a local digital signal processor disposed at and associated with said weaving machine;
  (3) transmitting, in real time, signals indicating said monitored operation from said local digital signal processor to a further digital signal processor;
  (4) comparing, substantially in real time, said indicating signals at said further processor with predetermined normal values and, if said comparison reveals a substantial difference between said indicating signals and said normal values, generating a control signal specifying at least one operating parameter of said weaving machine;
  (5) transmitting said control signal to said weaving machine local processor; and
  (6) controlling, with said local processor substantially in real time, the operation of said weaving machine in response to said control signal.

4. A method as in claim 3 wherein:
said monitoring step includes the step of repetitively measuring the filling arrival time of said weaving machine;
said method further includes calculating an average filling arrival time for a plurality of picks of said weaving machine;
said comparing step includes comparing said calculated average filling arrival time with a predetermined desired filling arrival time, and generating an air pressure control signal if a substantial difference exists between said average filling arrival time and said predetermined desired filling arrival time; and
said controlling step includes changing the insertion air pressure of said weaving machine in response to said air pressure control signal.

5. A method of controlling a textile weaving machine comprising:
  (1) continually monitoring the operation of a weaving machine;
  (2) in response to a predetermined stop condition, automatically stopping said weaving machine with a local digital signal processor disposed at and associated with said weaving machine;
  (3) transmitting, in real time, signals indicating said stopped condition from said local digital signal processor to a further digital signal processor;
  (4) automatically generating a request for human intervention with said further digital signal processor in response to said stopped condition indicating signals;
  (5) timing how long it takes a person to arrive at said weaving machine in response to said request;
  (6) timing how long it takes the person arriving at said weaving machine to restart the weaving machine; and
  (7) storing the durations timed by said timing steps (5) and (6) in a memory associated with said further processor.

6. A method as in claim 5 further including:
transmitting signals from said local processor to said further processor indicating the time it takes a person to arrive at said weaving machine in response to said request; and
transmitting signals from said local processor to said further processor indicating the time it takes the person arriving at said weaving machine to restart the machine.

7. A method as in claim 5 further including:
inputting a request for technician services to said local processor;
transmitting a technician service request signal from said local processor to said further processor in response to said technician service request; and
alerting a technician in response to said technician service request signal.

8. A method as in claim 7 further including:
timing how long it takes for a techician to arrive at said weaving machine in response to said alert, thereby obtaining a first duration; and
transmitting a signal indicating said timed first duration to said further processor.

9. A method as in claim 8 further including:
timing how long it takes a technician to repair and restart said weaving machine after arriving at said weaving machine, thereby obtaining a second duration; and
transmitting a signal indicating said second duration to said further processor.

10. A method as in claim 7 further including:
timing how long it takes a technician to repair and restart said weaving machine after arriving at said weaving machine, thereby obtaining a first duration; and
transmitting a signal indicating said first duration to said further processor.

11. A method as in claim 5 wherein:
said transmitting step (3) includes the steps of:
  (a) transmitting a field identifying said weaving machine,
  (b) transmitting a field indicating the time said weaving machine is stopped by said stopping step (2), and
  (c) transmitting a field identifying said stop condition; and
said method further includes the steps of:
manually inputting a declared stop cause to said local processor means, said declared stop cause specifying a reason said weaving machine stopped; and
transmitting the following information from said local processor means to said further processor means:

(i) said weaving machine identification,
(ii) said operator repair time timed by said timing step (6),
(iii) said declared stop cause, and
(iv) the time said weaving machine is restarted.

12. A method of controlling a textile weaving machine comprising:
(1) continually monitoring the filling arrival time of an air insertion weaving machine;
(2) calculating, in real time, an average filling arrival time in response to plural monitored arrival times of said weaving machine;
(3) comparing, in real time, said average arrival time with a predetermined desired arrival time; and
(4) if said comparison reveals said average arrival time differs substantially from said desired arrival time, automatically adjusting weaving machine insertion air pressure so as to optimize said filling arrival time.

13. A method as in claim 12 wherein:
said method further includes continually monitoring weaving machine insertion air pressure, and comparing said monitored insertion air pressure with a desired air pressure range; and
said step (4) includes requesting human intervention if said first-mentioned comparison reveals said average arrival time differs substantially from said desired arrival time and said second-mentioned comparison reveals said monitored insertion air pressure is outside of said desired air pressure range.

14. A method of controlling a textile weaving machine comprising:
(1) monitoring the number of picks performed by a weaving machine with a local digital signal processor associated with said weaving machine;
(2) transmitting a signal from said local processor to a further digital signal processor distinct from said local processor indicating how many picks have been performed by said weaving machine;
(3) incrementing a count value maintained by said further processor indicating the total number of picks performed by said weaving machine in response to said transmitted signal;
(4) comparing said count value with a predetermined value;
(5) if said comparison reveals said count value is greater than or equal to said predetermined value, transmitting a stop command from said further processor to said local processor;
(6) stopping said weaving machine with said local processor in response to said stop command; and
(7) repeating said steps (1)–(6).

15. A method of controlling a textile weaving machine comprising:
(1) monitoring the number of picks performed by a weaving machine with a local digital signal processor associated with said weaving machine;
(2) transmitting a signal from said local processor to a further digital signal processor distinct from said local processor each time a predetermined number of picks have been performed by said weaving machine;
(3) incrementing a count value indicating the total number of picks performed by said weaving machine in response to said transmitted signal;
(4) comparing said count value with a predetermined value;
(5) if said comparison reveals said count value is greater than or equal to said predetermined value, transmitting a stop command from said further processor to said local processor;
(6) stopping said weaving machine with said local processor in response to said stop command; and
(7) requesting a person to perform a cut doff on said weaving machine if said comparison reveals said count value is greater than or equal to said predetermined value.

16. A method of controlling a textile weaving machine comprising:
(1) monitoring the number of picks performed by a weaving machine with a local digital signal processor associated with said weaving machine;
(2) transmitting a signal from said local processor to a further digital signal processor distinct from said local processor indicating the number of picks which have been performed by said weaving machine;
(3) incrementing a count value indicating the total number of picks performed by said weaving machine in response to said transmitted signal;
(4) comparing said count value with a predetermined value;
(5) if said comparison reveals said count value is greater than or equal to said predetermined value, transmitting plural independent weaving variables from said further processor to said local processor; and
(6) automatically changing the operational set points of said weaving machine with said local processor in response to said transmitted plural independent weaving variables.

17. A method as in claim 16 wherein:
said method further includes storing plural sets of plural independent weaving variables in a memory associated with said further processor, each such set representing a different style of cloth, and selecting one of said plural sets of variables; and
said transmitting step comprises transmitting the plural independent variables in said selected set.

18. A method as in claim 15 further including:
if said comparison reveals said count value is greater than or equal to said predetermined value, transmitting a stop command from said further processor to said local processor; and
stopping said weaving machine with said local processor in response to said stop command.

19. A method as in claim 16 wherein:
said transmitting step includes transmitting electronic dobby control signals from said further processor to said local processor; and
said method further includes controlling the operation of an electronic dobby component of said weaving machine with said local processor in response to said transmitted dobby control signals.

20. A method of controlling a textile weaving machine comprising:
continually monitoring the operation of a weaving machine;
(2) in response a predetermined stop condition, automatically stopping said weaving machine with a local digital signal processor disposed at and associated with said weaving machine;
(3) automatically transmitting a request for human intervention from said local processor to a further processor in real time;

(4) generating an alert signal with said local processor, said alert signal alerting people to intervene in the operation of said weaving machine; and (5) monitoring the performance of said people attempting to restart said weaving machine with said local processor.

21. A method as in claim 20 further including:

transmitting signals indicating the performance of said people from said local processor to said further processor;

statistically analyzing said performance at said further processor in response to said transmitted signals and in response to predefined normal expected performance parameters; and if said analysis reveals said performance is exceptional, producing an indication of said exceptional performance.

22. A system for controlling a textile weaving machine comprising:

monitoring means for continually monitoring the operation of a weaving machine;

first digital signal processor means disposed at and associated with said weaving machine and connected to said monitoring means for automatically controlling said weaving machine in response to said monitored operation;

means connecting said first digital signal processor means to a further digital signal processor means for transmitting, in real time, signals indicating said monitored operation from said first digital signal processor means to said further digital signal processor means;

said further digital signal processor means for comparing, substantially in real time, said indicating signals with predetermined normal values and, if said comparison reveals a substantial difference between said indicating signals and said normal values, generating a control signal specifying at least one operating parameter of said weaving machine;

said transmitting means also for transmitting said control signal to said first digital signal processor means; and said first digital signal processor means also for controlling, substantially in real time, the operation of said weaving machine in response to said control signal.

23. A system as in claim 22 wherein:

said monitoring means includes means for repetitively measuring the filling arrival time of said weaving machine;

said first and/or further digital signal processor means includes means for calculating an average filling arrival time for a plurality of picks of said weaving machine;

said further digital signal processor means includes means for comparing said calculated average filling arrival time with a predetermined desired filling arrival time, and generating an air pressure control signal if a substantial difference exists between said average filling arrival time and said predetermined desired filling arrival time; and said system further includes air pressure changing means, connected to said first digital signal processor means, for changing the insertion air pressure of said weaving machine in response to said air pressure control signal.

24. A system for controlling a textile weaving machine comprising:

monitoring means for continually monitoring the operation of a weaving machine;

local digital signal processor means, connected to said monitoring means and disposed at and associated with said weaving machine, for automatically stopping said weaving machine in response to a predetermined stop condition;

transmitting means connected to said local digital signal processor means for transmitting, in real time, signals indicating said stopped condition from said local digital signal processor means to a further digital signal processor means remote to said weaving machine;

said first and further digital signal processor means in combination for:

(a) automatically generating a request for human intervention in response to said stopped condition indicating signals, (b) timing how long it takes a person to arrive at said weaving machine in response to said request, (c) timing how long it takes the person arriving at said weaving machine to restart the weaving machine, and (d) storing the durations timed by said timing.

25. Apparatus for controlling a textile weaving machine of the type including an air insertion system, said apparatus comprising:

monitoring means coupled to said weaving machine air insertion system for continually monitoring the filling arrival time of said weaving machine;

calculating means connected to said monitoring means for calculating, in real time, an average filling arrival time in response to plural monitored arrival times of said weaving machine;

comparing means connected to said calculating means for comparing, in real time, said average arrival time with a predetermined desired arrival time; and automatic adjusting means connected to said weaving machine air insertion system and to said comparing means for automatically adjusting weaving machine insertion air pressure so as to optimize said filling arrival time if said comparison reveals said average arrival time differs substantially from said desired arrival time.

26. Apparatus as in claim 25 wherein:

said monitoring means includes means for continually monitoring weaving machine insertion air pressure;

said comparing means includes means for comparing said monitored insertion air pressure with a desired air pressure range; and said apparatus further includes requesting means for requesting human intervention if said first-mentioned comparison reveals said average arrival time differs substantially from said desired arrival time and said second-mentioned comparison reveals said monitored insertion air pressure is outside of said desired air pressure range.

27. Apparatus for controlling a textile weaving machine comprising:

local digital signal processor means connected to and associated with said weaving machine for monitoring the number of picks performed by a weaving machine;

transmitting means connected to said local digital signal processor means for periodically transmitting a signal from said local processor means to a further digital signal processor means distinct from said local processor means indicating how many picks have been performed by said weaving machine;

said further digital signal processor means for:
(a) incrementing a count value indicating the total number of picks performed by said weaving machine in response to said transmitted signal,
(b) comparing said count value with a predetermined value, and
(c) if said comparison reveals said count value is greater than or equal to said predetermined value, controlling said transmitting means to transmit a stop command from said further processor means to said local processor means;

said local processor means also for stopping said weaving machine in response to said stop command.

28. Apparatus for controlling a textile weaving machine comprising:

local digital signal processor means connected to said weaving machine for monitoring the number of picks performed by said weaving machine;

transmitting means connected to said local processor means for transmitting a signal from said local processor means to a further digital signal processor means distinct from said local processor means each time a predetermined number of picks have been performed by said weaving machine;

said further digital signal processor means including:
means for incrmenting a count value indicating the total number of picks performed by said weaving machine in response to said transmitted signal,
means for comparing said count value with a predetermined value,
means for controlling said transmitting means to transmit a stop command to said local processor means if said comparison reveals said count value is greater than or equal to said predetermined value, and
means for requesting a person to perform a cut doff on said weaving machine if said comparison reveals said count value is greater than or equal to said predetermined value;

said local processor means including means for stopping said weaving machine with said local processor in response to said stop command.

29. Apparatus for controlling a textile weaving machine comprising:

local digital signal processor means associated with said weaving machine for monitoring the number of picks performed by said weaving machine;

transmitting means connected to said local processor means for transmitting a signal from said local processor means to a further digital signal processor distinct from said local processor indicating the number of picks which have been performed by said weaving machine;

said further digital signal processor means including:
means for incrementing a count value indicating the total number of picks performed by said weaving machine in response to said transmitted signal,
means for comparing said count value with a predetermined value, and
means for controlling said transmitting means to transmit plural independent weaving variables from said further processor to said local processor means if said comparison reveals said count value is greater than or equal to said predetermined value; and said local processor means including means for automatically changing the operational set points of said weaving machine in response to said transmitted plural independent weaving variables.

30. Apparatus for controlling a textile weaving machine comprising:

monotoring means for continually monitoring the operation of a weaving machine;

local digital signal processor means disposed at and associated with said weaving machine and connected to said monitoring means for automatically stopping said weaving machine in response to a predetermined stop condition;

request generating means connected to said local digital signal processor means for automatically generating a request for human intervention in real time;

said local processor means also for generating an alert signal alerting people to intervene in the operation of said weaving machine, and for monitoring the performance of said people attempting to restart said weaving machine with said local processor.

31. Apparatus as in claim 30 further including:
transmitting means for transmitting signals indicating the performance of said people from said local processor means to a further processor means;
said further processor means for statistically analyzing said performance in response to said transmitted signals and in response to predefined normal expected performance parameters, and for producing an indication of exceptional performance if said analysis reveals said performance is exceptional.

* * * * *